United States Patent
Curtis et al.

(10) Patent No.: US 9,222,798 B2
(45) Date of Patent: Dec. 29, 2015

(54) SYSTEMS AND METHODS FOR IDENTIFYING AN ACTIVITY OF A USER BASED ON A CHRONOLOGICAL ORDER OF DETECTED MOVEMENTS OF A COMPUTING DEVICE

(75) Inventors: Scott Curtis, Durham, NC (US); Greg Evans, Raleigh, NC (US); Juan Pons, Pittsboro, NC (US)

(73) Assignee: MODENA ENTERPRISES, LLC, Wilmington, DE (US)

( * ) Notice: Subject to any disclaimer, the term of this patent is extended or adjusted under 35 U.S.C. 154(b) by 814 days.

(21) Appl. No.: 12/974,594

(22) Filed: Dec. 21, 2010

(65) Prior Publication Data

US 2012/0136529 A1   May 31, 2012

Related U.S. Application Data

(60) Provisional application No. 61/289,120, filed on Dec. 22, 2009.

(51) Int. Cl.
| | |
|---|---|
| G06F 15/00 | (2006.01) |
| G01P 15/00 | (2006.01) |
| G01C 21/00 | (2006.01) |
| G01C 21/36 | (2006.01) |

(Continued)

(52) U.S. Cl.
CPC ............ G01C 21/3697 (2013.01); G01C 21/20 (2013.01); G01C 21/3617 (2013.01); *G01C 21/3484* (2013.01)

(58) Field of Classification Search
CPC ........... G01C 21/3484; G01C 21/3617; G01C 21/20; G01C 21/2617; G01C 21/3697
USPC .......................... 701/32.3, 450; 702/141, 150
See application file for complete search history.

(56) References Cited

U.S. PATENT DOCUMENTS

| | | |
|---|---|---|
| 5,550,907 A | 8/1996 | Carlsen |
| 5,565,909 A | 10/1996 | Thibadeau et al. |

(Continued)

FOREIGN PATENT DOCUMENTS

| | | |
|---|---|---|
| EP | 1923830 A2 | 5/2008 |
| JP | 2004118853 A | 4/2004 |

(Continued)

OTHER PUBLICATIONS

MetroSense Project: People-Centric Sensing at Scale, Eisenman et al., WSW '06 at SenSys '06, Oct. 31, 2006.
People-Centric Urban Sensing, Campbell et al., Electrical Engineering, Columbia University, 2005.
Poster Abstract: Virtual Sensing Range, Miluzzo et al., SenSys '06, Nov. 1-3, 2006.

(Continued)

*Primary Examiner* — Spencer Patton
*Assistant Examiner* — Robert Nguyen
(74) *Attorney, Agent, or Firm* — Olive Law Group, PLLC

(57) ABSTRACT

Disclosed herein are methods and systems for identifying an activity of a user based on a chronological order of detected movements of a computing device. According to embodiments of the present disclosure, the method may include detecting movements of a computing device. The method also includes determining a chronological order of the detected movements. Further, the method includes identifying an activity of a user of the computing device based on the detected movements and chronological order. The method also includes determining a geographic location associated with at least one of the movements. Further, the method includes presenting identification of the activity and the geographic location.

35 Claims, 10 Drawing Sheets

(51) Int. Cl.
*G01C 21/20* (2006.01)
*G01C 21/34* (2006.01)

(56) References Cited

U.S. PATENT DOCUMENTS

| | | | |
|---|---|---|---|
| 5,577,041 A | 11/1996 | Sharma et al. | |
| 5,781,150 A * | 7/1998 | Norris | 342/357.34 |
| 6,011,975 A | 1/2000 | Emery et al. | |
| 6,278,704 B1 | 8/2001 | Creamer et al. | |
| 6,314,296 B1 | 11/2001 | Hamada et al. | |
| 6,366,856 B1 | 4/2002 | Johnson | |
| 6,724,872 B1 | 4/2004 | Moore et al. | |
| 6,826,478 B2 * | 11/2004 | Riewe et al. | 701/470 |
| 6,978,003 B1 | 12/2005 | Sylvain | |
| 6,992,584 B2 | 1/2006 | Dooley | |
| 7,043,362 B2 | 5/2006 | Krull et al. | |
| 7,046,994 B1 | 5/2006 | Padawer et al. | |
| 7,047,019 B1 | 5/2006 | Cox et al. | |
| 7,054,621 B2 | 5/2006 | Kennedy | |
| 7,068,768 B2 | 6/2006 | Barnes | |
| 7,085,578 B2 | 8/2006 | Barclay et al. | |
| 7,096,009 B2 | 8/2006 | Mousseau et al. | |
| 7,120,455 B1 | 10/2006 | Chen et al. | |
| 7,139,797 B1 | 11/2006 | Yoakum et al. | |
| 7,143,214 B2 | 11/2006 | Hayes et al. | |
| 7,184,523 B2 | 2/2007 | Dixit et al. | |
| 7,196,630 B2 | 3/2007 | Baker | |
| 7,212,111 B2 | 5/2007 | Tupler et al. | |
| 7,215,750 B2 | 5/2007 | Nguyen et al. | |
| 7,231,428 B2 | 6/2007 | Teague | |
| 7,248,677 B2 | 7/2007 | Randall et al. | |
| 7,269,413 B2 | 9/2007 | Kraft | |
| 7,330,721 B2 | 2/2008 | Bhatia et al. | |
| 7,346,668 B2 | 3/2008 | Willis | |
| 7,440,900 B2 | 10/2008 | Chang | |
| 7,487,190 B2 | 2/2009 | Black et al. | |
| 7,526,306 B2 | 4/2009 | Brems et al. | |
| 7,529,540 B2 | 5/2009 | Cox et al. | |
| 7,542,558 B2 | 6/2009 | Klein et al. | |
| 7,548,756 B2 | 6/2009 | Velthuis et al. | |
| 7,640,293 B2 | 12/2009 | Wilson et al. | |
| 7,796,998 B1 | 9/2010 | Zellner et al. | |
| 7,953,447 B2 | 5/2011 | Shostak | |
| 8,036,356 B1 | 10/2011 | Ghosh et al. | |
| 8,185,132 B1 | 5/2012 | Katpelly et al. | |
| 8,392,116 B2 * | 3/2013 | Lehmann et al. | 701/524 |
| 8,509,411 B2 * | 8/2013 | Laine et al. | 379/207.12 |
| 8,532,678 B2 * | 9/2013 | Geelen | 455/457 |
| 8,532,923 B2 * | 9/2013 | Bruelle-Drews | 701/433 |
| 2001/0028703 A1 | 10/2001 | Katseff et al. | |
| 2002/0055088 A1 | 5/2002 | Feig | |
| 2002/0098844 A1 | 7/2002 | Friedenfelds et al. | |
| 2002/0172339 A1 | 11/2002 | Creswell et al. | |
| 2003/0050984 A1 | 3/2003 | Pickup et al. | |
| 2003/0112928 A1 | 6/2003 | Brown et al. | |
| 2003/0119495 A1 | 6/2003 | Hanninen et al. | |
| 2003/0147518 A1 | 8/2003 | Albal et al. | |
| 2003/0152206 A1 | 8/2003 | Kawaguchi et al. | |
| 2003/0182052 A1 | 9/2003 | DeLorme | |
| 2003/0229717 A1 | 12/2003 | Teague | |
| 2004/0066920 A1 | 4/2004 | Vandermeijden | |
| 2004/0157562 A1 | 8/2004 | Ovaskainen et al. | |
| 2004/0186848 A1 | 9/2004 | Kobashikawa et al. | |
| 2005/0033811 A1 | 2/2005 | Bhogal et al. | |
| 2005/0125148 A1 * | 6/2005 | Van Buer et al. | 701/209 |
| 2005/0202781 A1 | 9/2005 | Steelberg et al. | |
| 2005/0272448 A1 | 12/2005 | Tran et al. | |
| 2006/0034441 A1 | 2/2006 | Kraft | |
| 2006/0052116 A1 | 3/2006 | Bhogal et al. | |
| 2006/0064739 A1 | 3/2006 | Guthrie et al. | |
| 2006/0128411 A1 | 6/2006 | Turcanu | |
| 2006/0153349 A1 | 7/2006 | Brun et al. | |
| 2006/0171523 A1 | 8/2006 | Greenwell | |
| 2006/0199567 A1 | 9/2006 | Alston | |
| 2006/0200490 A1 | 9/2006 | Abbiss | |
| 2006/0215823 A1 | 9/2006 | Gruchala et al. | |
| 2006/0247853 A1 | 11/2006 | Jung et al. | |
| 2007/0036316 A1 | 2/2007 | Croak et al. | |
| 2007/0091878 A1 | 4/2007 | Croak et al. | |
| 2007/0117552 A1 | 5/2007 | Gobburu et al. | |
| 2007/0135110 A1 | 6/2007 | Athale et al. | |
| 2007/0150174 A1 * | 6/2007 | Seymour et al. | 701/200 |
| 2007/0197233 A1 | 8/2007 | Feng | |
| 2007/0243880 A1 | 10/2007 | Gits et al. | |
| 2007/0249327 A1 | 10/2007 | Nurmi | |
| 2007/0260725 A1 | 11/2007 | McCuller | |
| 2007/0266097 A1 | 11/2007 | Harik et al. | |
| 2007/0281689 A1 | 12/2007 | Altman et al. | |
| 2008/0027639 A1 * | 1/2008 | Tryon | 701/209 |
| 2008/0125106 A1 | 5/2008 | Lee et al. | |
| 2008/0195261 A1 * | 8/2008 | Breed | 701/2 |
| 2008/0214148 A1 | 9/2008 | Ramer et al. | |
| 2008/0250066 A1 | 10/2008 | Ekstrand et al. | |
| 2008/0304637 A1 | 12/2008 | Ganganna | |
| 2009/0034696 A1 | 2/2009 | Ramanathan | |
| 2009/0063154 A1 | 3/2009 | Gusikhin et al. | |
| 2009/0086947 A1 | 4/2009 | Vendrow | |
| 2009/0104895 A1 | 4/2009 | Kasturi et al. | |
| 2009/0124243 A1 | 5/2009 | Routley et al. | |
| 2009/0186629 A1 | 7/2009 | Soelberg et al. | |
| 2009/0197621 A1 | 8/2009 | Book | |
| 2009/0215486 A1 | 8/2009 | Batni et al. | |
| 2009/0216775 A1 | 8/2009 | Ratliff | |
| 2009/0219921 A1 | 9/2009 | Beinroth et al. | |
| 2009/0225968 A1 | 9/2009 | Paranjape et al. | |
| 2009/0275307 A1 | 11/2009 | Kahn | |
| 2009/0311999 A1 | 12/2009 | Sarkar et al. | |
| 2009/0316951 A1 | 12/2009 | Soderstrom | |
| 2009/0319176 A1 * | 12/2009 | Kudoh et al. | 701/207 |
| 2010/0026570 A1 * | 2/2010 | Amidi | 342/357.09 |
| 2010/0070171 A1 * | 3/2010 | Barbeau et al. | 701/207 |
| 2010/0130213 A1 | 5/2010 | Vendrow et al. | |
| 2010/0149306 A1 | 6/2010 | Gopal et al. | |
| 2010/0228560 A1 | 9/2010 | Balasaygun et al. | |
| 2010/0316205 A1 | 12/2010 | Zheng et al. | |
| 2010/0317341 A1 | 12/2010 | Ferren | |
| 2011/0034156 A1 | 2/2011 | Gatti et al. | |
| 2011/0160998 A1 * | 6/2011 | Rissanen | 701/201 |
| 2011/0212712 A1 | 9/2011 | Abdel-Kader | |
| 2011/0238289 A1 * | 9/2011 | Lehmann et al. | 701/201 |
| 2011/0276565 A1 * | 11/2011 | Zheng et al. | 707/724 |
| 2012/0050101 A1 * | 3/2012 | Whiteman | 342/357.31 |
| 2012/0134321 A1 | 5/2012 | Amidon et al. | |
| 2012/0135716 A1 * | 5/2012 | Katpelly et al. | 455/414.1 |
| 2012/0135718 A1 | 5/2012 | Amidon et al. | |
| 2012/0135744 A1 * | 5/2012 | Curtis et al. | 455/456.1 |
| 2012/0136942 A1 | 5/2012 | Amidon et al. | |
| 2013/0006469 A1 * | 1/2013 | Green et al. | 701/36 |
| 2013/0166096 A1 * | 6/2013 | Jotanovic | 701/1 |

FOREIGN PATENT DOCUMENTS

| | | |
|---|---|---|
| JP | 2004205443 A | 7/2004 |
| JP | 2007079945 A | 3/2007 |
| TW | 262408 B | 9/2006 |
| WO | 01/31964 A1 | 5/2001 |
| WO | 01/58165 A2 | 8/2001 |
| WO | 02/11407 A2 | 2/2002 |
| WO | 2006/075853 A1 | 7/2006 |
| WO | 2009/022446 A1 | 2/2009 |

OTHER PUBLICATIONS

Toward Societal Scale Sensing using Mobile Phones, Campbell et al., Nov. 12-13, 2009.
The Second Life of a Sensor: Integrating Real-world Experience in Virtual Worlds using Mobile Phones, Musolesi et al., HotEmNets '08, Jun. 2-3, 2008.
Overload Traffic Management for Sensor Networks, Wan et al., ACM Trans. Sens. Netw. 3, 4, Article 18, Oct. 2007.
Solicitation-based Forwarding for Sensor Networks, Lee et al., 2006.
SoundSense: Scalable Sound Sensing for People-Centric Applications on Mobile Phones, Pan et al., MobiSys '09, Jun. 22-25, 2009.

(56) References Cited

OTHER PUBLICATIONS

Structuring Contention-based Channel Access in Wireless Sensor Networks, Eisenman et al., IPSN'06, Apr. 19-21, 2006.
Urban Sensing: Opportunistic or Participatory?, Lane et al., 2005.
Bubble-Sensing: A New Paradigm for Binding a Sensing Task to the Physical World using Mobile Phones, Lu et al., 2005.
CenceMe: Injecting Sensing Presence into Social Network Applications using Mobile Phones (Demo Abstract), Campbell et al., 2005.
Evaluating the iPhone as a Mobile Platform for People-Centric Sensing Applications, Miluzzo et al., UrbanSense08, Nov. 4, 2008.
Radio Characterization of 802.15.4 and Its Impact on the Design of Mobile Sensor Networks, Miluzzo et al., EWSN 2008.
The Rise of People-Centric Sensing, Campbell et al., IEEE Computer Society, 2008.
A Survey of Mobile Phone Sensing, Lane et al., IEEE Communications Magazine, Sep. 2010.
The Influence of Microprocessor Instructions on the Energy Consumption of Wireless Sensor Networks, Lane et al., 2006.
Ambient Beacon Localization: Using Sensed Characteristics of the Physical World to Localize Mobile Sensors, Lane et al., EmNets'07, Jun. 25-26, 2007.
E-CSMA: Supporting Enhanced CSMA Performance in Experimental Sensor Networks using Per-neighbor Transmission Probability Thresholds, Eisenman et al., 2007.
Cooperative Techniques Supporting Sensor-based People-centric Inferencing, Lane et al., 2005.
Demo Abstract: Transforming the Social Networking Experience with Sensing Presence from Mobile Phones, Campbell et al., SenSys'08, Nov. 5-7, 2008.
Sensing Meets Mobile Social Networks: The Design, Implementation and Evaluation of the CenceMe Application, Miluzzo et al., SenSys'08, Nov. 5-7, 2008.
CenceMe—Injecting Sensing Presence into Social Networking Applications, Milozzo et al., EuroS SC, 2007.
CaliBree: A Self-calibration System for Mobile Sensor Networks, Miluzzo et al., DCOSS, LNCS, 2008.
The BikeNet Mobile Sensing System for Cyclist Experience Mapping, Miluzzo et al., SenSys '07, Nov. 6-7, 2007.
Techniques for Improving Opportunistic Sensor Networking Performance, Eisenman et al., 2005.
BikeNet: A Mobile Sensing System for Cyclist Experience Mapping, Eisenman et al., ACM Transactions on Sensor Networks, vol. 6, No. 1, Article 6, Dec. 2009.
Park-n. Find 2.0—iPhone App Index, http://www.iphoneappindex.com/2009/11/19/parkn-find-2-0, Nov. 19, 2009.
Posimotion website, G-Park, Website: http://www.posimotion.com/index.php?go=applications&option=view&entry=1, 2007-2009.
Ultimate Android, Dec. 2009.
Audet, F. et al., "Extended REFER," Slides from International Engineering Task Force (IETF), 59th Meeting, Feb. 29-Mar. 5, 2004, Seoul, South Korea, found at <http://www.softarmor.com/sipping/meets/ietf59/slides/>, 13 pages.
"Cellity Address book 2.0," Presentation, Mobile Media Summit, Medienforum nrw, Koln, Jun. 24, 2009, cellity AG, Hamburg, Germany, 18 pages.
"City to showcase Typetalk phone system for deaf," NEWS.scotsman.com, at <http://news.scotsman.com/health/City-to-showcase--Typetalk.4755272.jp>, updated on Dec. 3, 2008, printed May 2, 2011, 2 pages.
"Ensure calls are never missed with SwyxWare Extended Call Routing," sas.uk, originally found at <http://www.sas-uk.net/Swyx-Extended-Call-Routing.htm>, found at Internet Archive, dated May 9, 2008, printed May 2, 2011, 1 page.
Fallon, Sean, "Tame Cube Concept: A Good Excuse is Just a Roll Away," Apr. 10, 2008, at <http://gizmodo.com/378514/tame-cube-concept-a-good-excuse-is-just-a-roll-away>, printed Oct. 13, 2011, 2 pages.
Forrest, Brady, "iPhone's Location-Aware Apps," O'Reilly Radar, Jul. 14, 2008, copyright 2005-2009, O'Reilly Media, Inc., Internet publication, at <http://radaroreilly.com/2008/07/iphone-location-aware-apps.html>, printed Sep. 15, 2009, 3 pages.
"Free Long Distance Calls via Google Maps," article published on Feb. 21, 2007, at <http://www.fivecentnickel.com/2007/02/21/free-long-distance-calls-via-google-maps>, copyright 2005-2008, PlanetB Media, LLC, printed Nov. 11, 2008, 7 pages.
"GeoWhitePages," dated Aug. 6, 2006, at <http://babasave.wordpress.com/2006/08/06/geowhitepages>, printed Nov. 11, 2008, 3 pages.
"Gizmo5," Wikipedia, found at <http://en.wikipedia.org/wiki/Gizmo5> on Internet Archive, last modified May 31, 2008, captured Jun. 13, 2008, printed Nov. 11, 2011, 2 pages.
"Google Maps Mania: Google Maps US/Canada Phone Book Mashups," dated Jun. 9, 2006, posted by Mike Pegg, at <http://googlemapsmania.blogspot.com/2006/06/google-maps-uscanada-phone-book.html>, printed Nov. 11, 2008, 1 page.
"Google PhoneBook," at <http://snopes.com/computer/internet/google.asp>, last updated Feb. 21, 2005, copyright 1995-2008, snopes.com, printed Nov. 11, 2008, 2 pages.
"Google Stalk," at <http://shinyplasticbag.com/projects/stalk>, available on the Internet Archive as of Jan. 4, 2006, printed Nov. 11, 2008, 1 page.
"GrandCentral," Wikipedia, found at <http://en.wikipedia.org/wiki/GrandCentral> on Internet Archive, last modified Aug. 8, 2008, captured Aug. 10, 2008, printed Nov. 11, 2011, 2 pages.
"IBM WebSphere Presence Server," IBM Data Sheet, Dec. 2007, IBM Corporation, found at ftp://public.dhe.ibm.com/software/pervasive/presenceserver/Presence_6_2_DS_Final.pdf, 4 pages.
"Ifbyphone: IVR Solutions, Click to Call, Voice Broadcast, Call Routing," originally found at <http://public.ifbyphone.com/>, copyright 2008, ifbyphone, printed Apr. 27, 2011, 4 pages.
Kaowthumrong, K. et al., "Automated Selection of the Active Device in Interactive Multi-Device Smart Spaces," in Workshop at UbiComp'02: Supporting Spontaneous Interaction in Ubiquitous Computing Settings,Goteborg, Sweden, Sep. 29-Oct. 1, 2002, 6 pages.
Koumpis, K. and Renals, S., "The Role of Prosody in a Voicemail Summarization System," In Proc. International Speech Communication Association (ISCA) Workshop on Prosody in Speech Recognition and Understanding, Red Bank, NJ, Oct. 22-24, 2001, pp. 87-92, 6 pages.
Messner, Richard A., "An Integrated Command Control and Communications Center for First Responders," Department of Electrical and Computer Engineering, University of New Hampshire, Durham, New Hampshire, 2005, found at <http://www.ece.unh.edu/svpal/Papers/2005%20SPIE%20Paper.pdf>, 14 pages.
"Method and System to Precisely Identify and Notify Callee's Status in Cellular Phone," at <http://priorartdatabase.com/IPCOM/000175628>, Oct. 16, 2008, 3 pages.
Milewski, Allen E. and Smith, Thomas M., "Providing Presence Cues to Telephone Users," AT&T Labs, Research, Oct. 3, 2000, at <http://web.mitedu/bentley/www/mobile/papers/presencecues.pdf>, 9 pages.
Nakanishi et al., "iCAMS: A Mobile Communication Tool Using Location and Schedule Information," PERVASIVE computing, published by IEEE CS and IEEE ComSoc, Jan.-Mar. 2004, pp. 82-88, copyright 2004, IEEE, 7 pages.
"Polar Bear Farm—iPhone Apps," at <http://www2.polarbearfarm.com/telegram.html>, copyright 2008, Polar Bear Farm Ltd, printed Apr. 27, 2011, 2 pages.
Scotsman.com, "City to showcase Typetalk phone system for deaf," Dec. 3, 2008, at <http://www.scotsman.com/news/city_to_showcase_typetalk_phone_system_for_deaf_1_1280979>, printed Oct. 13, 2011, 1 page.
"Slydial situations," originally found at <http://slydial.com/>, printed Apr. 27, 2011, 2 pages.
"User-Centric Implications | RebelVox Technology," User Benefits, found at <http://www.rebelvox.com/en/technology/user-benefits.php> on the Internet Archive, dated Mar. 1, 2009, copyright 2009, RebelVox, printed Nov. 11, 2011, 1 page.

\* cited by examiner

SYSTEMS AND METHODS FOR IDENTIFYING AN ACTIVITY OF A USER BASED ON A CHRONOLOGICAL ORDER OF DETECTED MOVEMENTS OF A COMPUTING DEVICE

CROSS REFERENCE TO RELATED APPLICATION

This application claims the benefit of U.S. provisional patent application No. 61/289,120, filed Dec. 22, 2009 and titled AUTOMATIC GENERATION OF ACTIVITY OR TRANSITION BREADCRUMBS FROM DETECTED USER MOVEMENTS, the content of which is hereby incorporated herein by reference in its entirety.

TECHNICAL FIELD

The present disclosure relates to systems and methods for identifying an activity of a user.

BACKGROUND

Many mobile devices, such as smart phones, have been enabled with functionality for determining a location of the device and for indicating the location to a user of the device. For example, a global positioning system (GPS) receiver can reside on a mobile device for determining a GPS position fix of the device. Using the GPS position fix, the mobile device can plot the device's location on a map rendered on a display as the device moves from place to place. These functions and features are useful for guiding users to a desired destination, such as when a user is driving or walking.

Another location-based feature of mobile devices allows users to generate a "breadcrumb" at a current location of the mobile device. The breadcrumb information can be stored on the mobile device and can be later accessed for use in guiding the user back to the location where the breadcrumb was generated. Such a feature can allow a user to find the user's parked car, other objects, or places of interest to where the user would like to return. To be useful, the user must remember to control the device to generate the breadcrumb when at the location of interest. If the user does not remember to control the device to generate the breadcrumb, the user will not be able to later use this feature for finding the location of interest. Accordingly, it is desirable to provide systems and methods for automatically marking a location of interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and systems for identifying an activity of a user based on a chronological order of detected movements of a computing device. According to embodiments of the present disclosure, the method may include detecting movements of a computing device. The method also includes determining a chronological order of the detected movements. Further, the method includes identifying an activity of a user of the computing device based on the detected movements and chronological order. The method also includes determining a geographic location associated with at least one of the movements. Further, the method includes presenting identification of the activity and the geographic location.

According to other embodiments of the present disclosure, a method includes detecting movements of a computing device. The method may also include determining a chronological order of the detected movements. Further, the method includes identifying an activity of a user of the computing device based on the detected movements and the chronological order. The method includes applying a predetermined action in response to identifying the activity.

According to other embodiments of the present disclosure, a method includes receiving movement information and associated activity information from a plurality of computing devices. The method also includes determining a confidence level for associating a movement of a computing device with an activity of a user based on the movement information and associated activity information. Further, the method includes communicating the confidence level to another computing device.

According to other embodiments of the present disclosure, a method includes identifying activities of a user of a computing device. The method also includes determining at least one of a chronological order and geographic locations of the identified activities. Further, the method may include deducing another activity based on the identified activities and the at least one of the chronological order and geographic locations. The method may also include presenting identification of the deduced activity.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
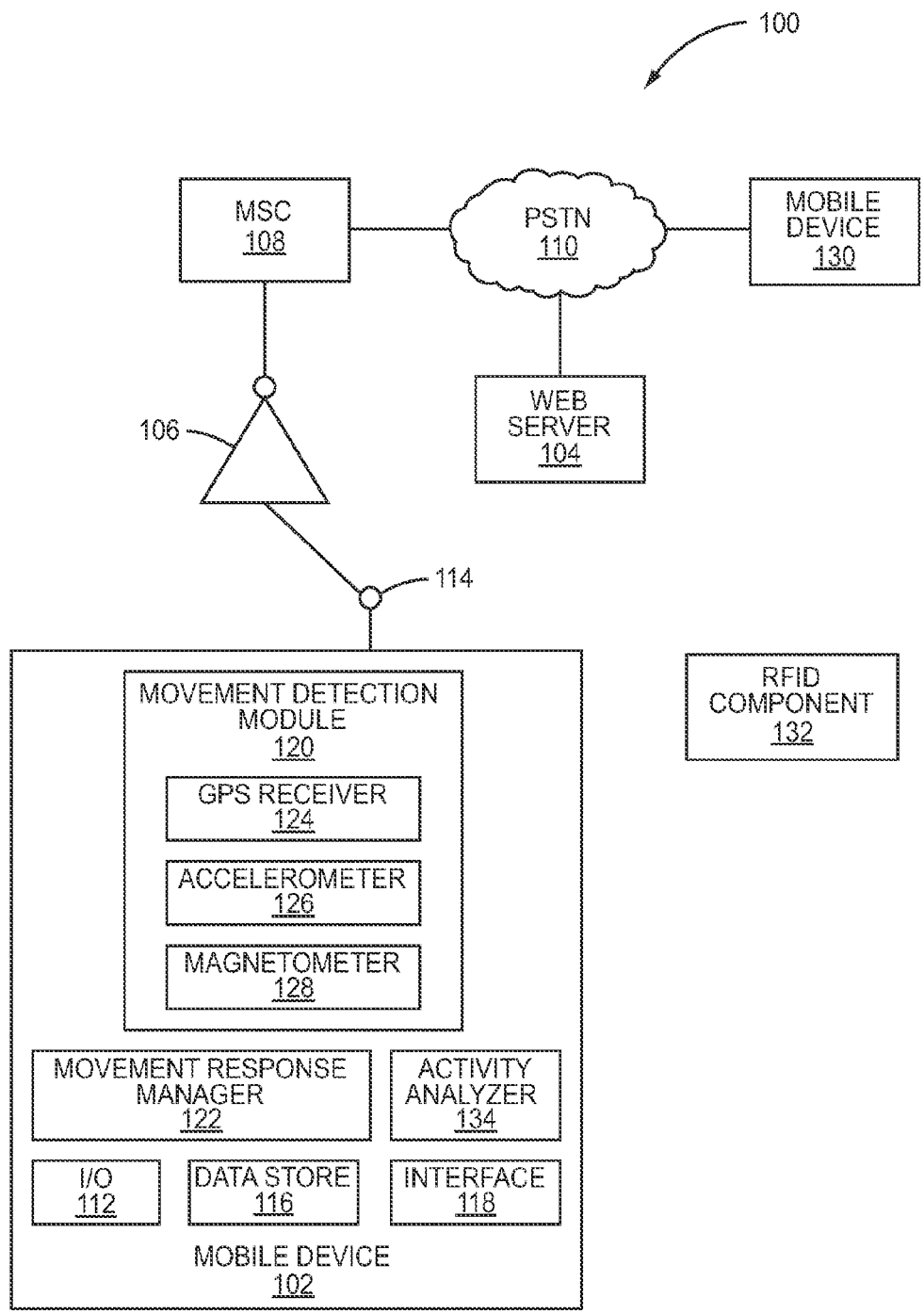
FIG. 1 is a schematic diagram of a system for detecting one or more movements of a computing device, determining a chronological order of the detected movement(s), identifying an activity of a user of the computing device based on the detected movement and the chronological order, determining a geographic location associated with one or more of the movements, and presenting identification of the activity and the geographic location according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable a computing device to detect movements of a computing device, to determine a chronological order of the detected movements, to identify an activity of a user of the computing device based on the detected movements and the chronological order, to determine a geographic location associated with one or more of the movements, and to present identification of the activity and the geographic location. For example, the computing device may automatically mark its location in response to predefined or predetermined movements detected by the computing device. A GPS receiver, accelerometer, and/or magnetometer residing on or in communication with the computing device can detect movements, and the computing device may interpret the movement as being associated with an activity of the user, such as, but not limited to, the user exiting or leaving a parked automobile. In response to determining that the user engaged in the activity, the computing device may automatically determine its current geographic location or may have previously determined the geographic location associated with one or more of the detected movements, and automatically mark or flag the location(s) in a mapping application. Subsequently, the user may interact with the computing device to display a map indicating the flagged geographic location(s) for use in guiding the user back to the location(s). Further, other embodiments enable a user to implement other features of the present disclosure in a computing device as will be described in further detail herein.

Other embodiments of the present disclosure enable a server, or any other suitable computing device, to receive movement information and associated activity information from a plurality of computing devices. For example, the computing devices may each detect movements and identify activities based on the detected movements. The server may determine a confidence level for associating computing device movement with an activity of a user based on the movement information and associated activity information. For example, the server may apply statistics for determining whether a specified movement should be correlated to an activity. A confidence level for correlating a detected movement to an activity may be communicated to other computing devices. Such confidence level information may be used by the computing device for identifying an activity of a user based on a movement and for applying a predetermined action in response to identifying the activity.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, or the like. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers (which are web browsers with small file sizes that can accommodate the reduced memory constraints of wireless networks), on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by, and interacted with by, a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The illustrative embodiments of the present disclosure are generally implemented within mobile devices that provide map display guidance information and that include equipment that indicate movement of the mobile device. However, as will be appreciated, the present disclosure is applicable to any computing device that is not fixed in position. Such devices may be preprogrammed with map data in a memory, or the map data may be placed into the memory while the device is in operation. For example, map data may be supplied through a communications link from a network, such as the Internet. In an implementation where a cellular telephone comprises the present disclosure, the map information may be received in the form of data packets from the Internet, via the cellular protocol and then stored into the memory of the device.

As referred to herein, a "GPS receiver" may be any equipment or component capable of determining a geographic location. In an example, the GPS receiver may receive satellite signals for use in determining the geographic location. Further, the GPS receiver may output a signal indicating the geographic location, such as coordinates of the geographic location.

As referred to herein, an "accelerometer" may be any equipment or component capable of measuring acceleration. This acceleration may be proper acceleration, the acceleration experienced relative to freefall. For example, an accelerometer may be a single- or multi-axis accelerometer configured to detect magnitude and direction of the acceleration as a vector quantity, and can be used to sense orientation, acceleration, vibration shock, or falling. A micromachined accelerometer may be provided in a computing device, and may output a signal indicating the acceleration measurements.

As referred to herein, a "magnetometer" may be any equipment or component capable of measuring the strength and/or direction of a magnetic field. A magnetometer may be provided on a computing device, such as a mobile device, for indicating direction, for example. The magnetometer may output a signal indicating a direction.

Applying a Predetermined Action in Response to Identifying an Activity of a User of a Computing Device The presently disclosed subject matter is now described in more detail. For example, FIG. 1 is a schematic diagram of a system 100 for detecting one or more movements of a computing device, determining a chronological order of the detected movement(s), identifying an activity of a user of the computing device based on the detected movement and the chronological order, determining a geographic location associated with one or more of the movements, and presenting identification of the activity and the geographic location according to embodiments of the present disclosure. Further, the system 100 may apply a predetermined action in response to identifying the activity according to embodiments of the present disclosure. Referring to FIG. 1, the system 100 includes a mobile device 102, which may be any type of computing device capable of detecting movement. The mobile device 102 comprises a number of functional components. This representation of the mobile device 102 is meant to be for convenience of illustration and description, and it should not be taken to limit the scope of the present disclosure as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile device 102 may include a graphics rendering engine for displaying information to the end user in the usual manner. The mobile device 102 is Internet-accessible and can interact with a web server 104 using known Internet protocols such as HTTP, HTTPS, and the like. The web server 104 is shown as a single device but this is not a requirement; one or more programs, processes, or other code may comprise the server and be executed on one or more machines (in one or more networked locations).

The mobile device 102 may communicate with various components of the system 100 using suitable network components, such as, but not limited to, a base station 106, an MSC 108, PSTN 110, and various other network components, which are not shown herein for ease of illustration. A wireless input/output (I/O) component 112 or any other suitable communication interface may be used for communicating data to other devices and for receiving communication data from other devices via a network as will be understood to those of skill in the art. The mobile device 102 may include an antenna 114 for wirelessly sending and receiving communications to the base station 106 or any other suitable communications unit. Geographic location information and any other information described herein in accordance with embodiments of the present disclosure may be stored in a data store 116, which can be any suitable type of memory. The user may use an interface 118 of the mobile device 102 for interacting with the mobile device 102.

The operation of the system can be described by the following example. As shown in FIG. 1, the mobile device 102 includes various functional components and an associated data store to facilitate the operation. The operation of the disclosed methods may be implemented using system components other than as shown in FIG. 1.

In this example system, the mobile device 102 includes a movement detection module 120 configured to detect movements of the mobile device 102. The mobile device 102 also includes a movement response manager 122 configured to determine a chronological order of the detected movements, to identify an activity of a user of the mobile device 102 based on detected movements and the chronological order, to determine a geographic location associated with one or more of the movements, and to present identification of the activity and the geographic location in accordance with embodiments of the present disclosure. Further, the movement response manager 122 may be configured to apply a predetermined action in response to identifying the activity in accordance with embodiments of the present disclosure. The movement detection module 120 and the movement response manager 122 may be implemented by hardware, by firmware, by combined hardware and software, or the like. Particularly, for example, the movement detection module 120 may include a satellite navigation system (e.g., a GPS receiver), one or more accelerometers, one or more magnetometers, suitable hardware, suitable firmware, suitable software, or combinations thereof configured to detect movements of the mobile device 102. The movement detection module 120 may communicate one or more signals to the movement response manager 122 for indicating the detected movements. The movement response manager 122 may include, for example, hardware, firmware, software, or combinations thereof configured to receive the signals indicating the detected movements, to determine a chronological order of the detected movements, to identify an activity of a user of the mobile device 102 based on detected movements and the chronological order, to determine a geographic location associated with one or more of the movements, and to present identification of the activity and the geographic location in accordance with embodiments of the present disclosure. Further, the movement response manager 122 may include, for example, hardware, firmware, software, or combinations thereof to apply a predetermined action in response to identifying the activity. The movement detection module 120 and the movement response manager 122 may also be configured to implement other functions described herein in accordance with embodiments of the present disclosure.

The movement detection module 120 may include one or more of a GPS receiver 124, accelerometer 126, and magnetometer 128 for detecting movements of the mobile device 102. For example, the GPS receiver 124 may be configured to output a GPS position fix. The movement detection module 120 may read and process GPS position fixes and may convert two, or more, GPS position fixes into a heading fix. The movement detection module 120 may determine whether the mobile device 102 has moved based on the GPS position fix information. Particularly, for example, if the position of the mobile device 102 changes over time, the movement detection module 120 may determine that the mobile device 102 has moved.

The accelerometer 126 and magnetometer 128 may be configured to output one or more signals indicating an acceleration or movement of the mobile device 102. The movement detection module 120 may read and process the signals, and may determine whether the mobile device 102 has moved based on the signals. In response to the movement detection module 120 detecting that the mobile device 102 has moved, the movement detection module 120 may indicate the movement to the movement response manager 122.

As mentioned herein above, one or more signals containing information indicating movements of the mobile device 102 may be communicated to the movement response manager 122. Movement information may indicate, but is not limited to, a speed of the mobile device, a velocity of the mobile device, a position of the mobile device, a route traveled by the mobile device, a direction of motion of the mobile device, an acceleration of the mobile device, a change in direction of the mobile device, combinations thereof, and the like. The movement information may be used by the movement response manager 122 for identifying or inferring an activity of the user of the mobile device 102. For example, signals generated by the GPS receiver 124, the accelerometer 126, and the magnetometer 128 may be monitored for identifying characteristic movement patterns that are indicative of transition moments or user activities, such as the parking of an automobile or an accident involving an automobile (e.g., a wreck). The movement response manager 122 may perform a set of statistical analyses and comparisons against a wide range of rule-based inferences from the output of the GPS receiver 124, the accelerometer 126, and/or the magnetometer 128. The rule-based inferences can be applied to identify the occurrence of the characteristic movement patterns or user activities. In response to detection of characteristic movement patterns or user activities, a predetermined action may be applied in accordance with embodiments of the present disclosure as described herein.

Figure 2:
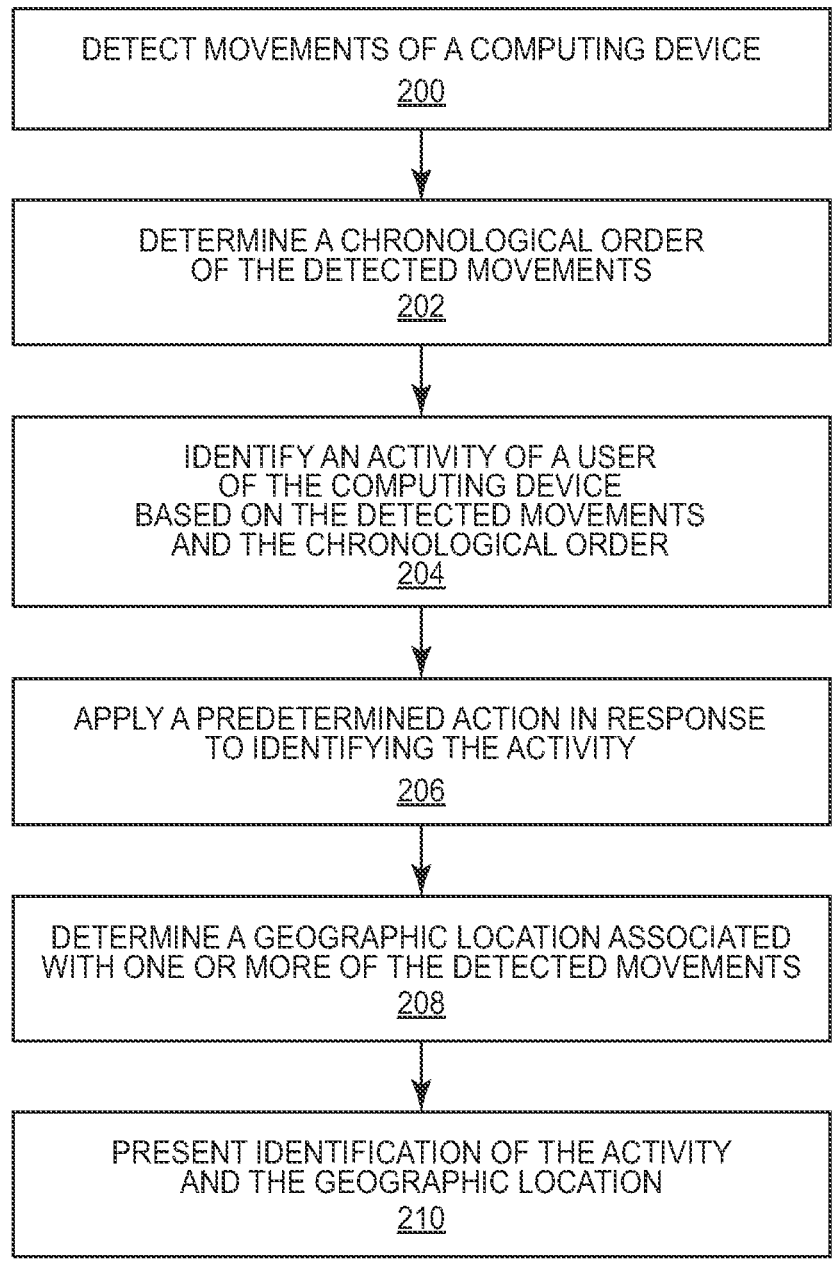
FIG. 2 is a flow chart of an exemplary method for applying a predetermined action based on detected movements of a computing device and a chronological order of the detected movement according to embodiments of the present disclosure.

FIG. 2 illustrates a flow chart of an exemplary method for applying a predetermined action based on detected movements of a computing device and a chronological order of the detected movement according to embodiments of the present disclosure. In addition, the exemplary method includes presenting identification of the activity and the geographic location. In this example, reference is made to the mobile device 102 shown in FIG. 1 for purposes of illustration; however, reference to the mobile device 102 should not be construed as limiting, and it should be appreciated that the method may be implemented by any suitable computing device.

Referring to FIG. 2, the method includes detecting movements of a computing device (step 200). A satellite navigation system, an accelerometer, a magnetometer, and/or any other suitable movement detection system or device may be used for detecting movements of the computing device. The mobile device 102, for example, may detect one or more predetermined movements or characteristic movement patterns that may be indicative of one or more user activities. In addition, two or more of the detected movements may be detected in a predetermined order, and the ordering may be indicative of one or more user activities.

In an example of the mobile device 102 operating to detect movements, the mobile device 102 may use one or combinations of the GPS receiver 124, the accelerometer 126, the magnetometer 128 for detecting movements of the mobile device 102. One or combinations of the GPS receiver 124, the accelerometer 126, and the magnetometer 128 may output signals indicative of movements of the mobile device 102. For example, the GPS receiver 124 may generate signals indicative of the current position of the mobile device 102, and the movement detection module 120 may determine that the mobile device 102 is moving if the position output by the GPS receiver 124 changes over time. In another example, the accelerometer 126 and/or magnetometer 128 may generate signals indicative of movements of the mobile device 102. Movement information may be stored in the data store 116 in any suitable format.

The method of FIG. 2 includes identifying a chronological order of the detected movements (step 202). For example, as movements are detected, the movement response manager 122 may determine an order in which the movements were detected. Identifications and the ordering of the movements may be stored in the data store 116. Further, an indication of a time in which the movements were detected may be determined. For example, time stamp information may be associated with each detected movement. Information indicating an order of the associated movements may be stored in the data store 116 in any suitable manner, such as by suitably associating time stamp information with corresponding movements.

Figure 3:
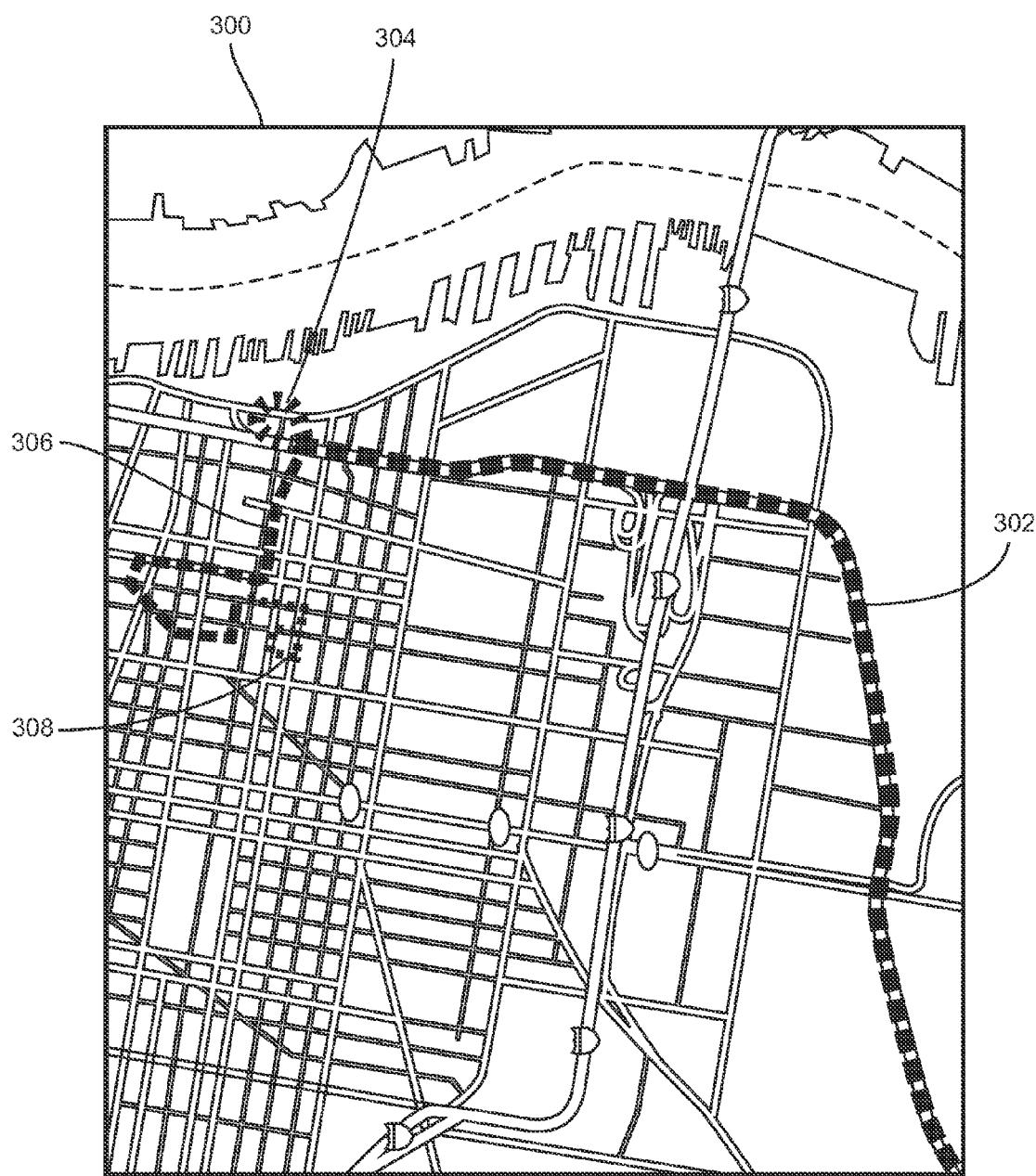
FIG. 3 depicts a road map showing movements of a computing device that may be detected and used for determining that an automobile is being parked in accordance with embodiments of the present disclosure.

FIG. 3 depicts a road map 300 illustrating movements of the mobile device 102 that may be detected and used for determining that a user's activity is parking an automobile in accordance with embodiments of the present disclosure. In this example, reference is made to the mobile device 102 shown in FIG. 1 for purposes of illustration; however, reference to the mobile device 102 should not be construed as limiting, and it should be appreciated that the method may be implemented by any suitable computing device. Referring to FIG. 3, the automobile may be driven by the user and may carry the user's mobile device 102 and travel along the route designated 302. As the mobile device 102 moves along the route 302, which is a highway in this example, the GPS receiver 124 may detect the speed and direction of travel of the mobile device 102. As the automobile continues along the routes 304, 306, and 308, the combination of the GPS receiver 124, accelerometer 126, and magnetometer 128 of the mobile device 102 may automatically detect the speed, acceleration, and direction of travel of the mobile device 102. As will be described in further detail below, this data may be stored in the data store 116 and may be used by the movement response manager 122 for determining that the user is parking an automobile. An ordering of the detected movements may also be determined and stored in the data store 116.

Returning to FIG. 2, the method includes identifying an activity of a user of the computing device based on the detected movements and the chronological order (step 204). The detected movement may be one of a plurality of predetermined movements occurring in a predetermined order. These movements may be indicative of transition moments or user activities. In an example, the movement response manager 122 may automatically analyze the movement information and may determine that the movements are indicative of transition moments or user activities, such as the parking of an automobile. The ordering of the detected movements may be used for identifying the activity. For example, the ordering of the above described detection of movements relating to parking an automobile may be used for determining that the movements relate to the parking activity.

Returning to and continuing the example of FIG. 3, the movement response manager 122 may retrieve the movement information from the data store 116. Further, using the movement information, the movement response manager 122 may determine that the user is a driver or passenger in an automobile exhibiting highway behavior at route 302, exhibiting exiting behavior at route 304, exhibiting city driving behavior at route 306, and parking behavior at route 308. The movement response manager 122 may identify these behaviors based on high speed motion (e.g., 65 mph speed) at route 302, slower speed (e.g., 45 mph speed) and changing direction (e.g., a near circular turn) at route 304, start-and-stop movement at route 306, and circling a short distance at low speed (e.g., circling a block at low speed) at route 308. The movement response manager 122 may determine that this combination of behaviors occurring in this order may be indicative of an automobile parking behavior. In this way, the movement response manager 122 can recognize these detected movements in a predetermined order, and identify an activity associated with the movements occurring in this chronological order as being the automobile parking behavior.

Other movements of the mobile device 102 in addition to the aforementioned movements may also be detected and used for identifying the automobile parking behavior. For example, near route 308 shown in FIG. 3, the GPS receiver 124 and the accelerometer 126 may detect backwards and forwards movement, which relates to backwards and forwards driving, and the movement may be identified as parallel parking of the automobile. Further, for example, the accelerometer 126 may detect a jostling motion, which relates to the user exiting the automobile, and the movement may be identified as characteristic behavior for exiting an automobile. In another example, the combination of the GPS receiver 124, accelerometer 126, and magnetometer 128 may detect a walking movement (e.g., about a 3 mph speed with jostling), and the movement may be identified as a walking behavior. These behaviors in combination with the other behaviors identified in the example of FIG. 3 may be used by the movement response manager 122 for identifying the automobile parking behavior. Such behaviors may serve to confirm identification of the automobile parking behavior.

Returning to FIG. 2, the method includes applying a predetermined action in response to identifying the activity (step 206). For example, the movement response manager 122 may automatically apply a predetermined action in response to identifying an activity. One or more predetermined actions may be specified by a user or otherwise specified for implementation in response to identifying a specified activity. An exemplary action applied in response to detection of characteristic movement patterns or user activities includes, but is not limited to, flagging a geographic location where the one or more of the characteristic movement patterns or user activities occurred. The geographic location may be flagged by storing data identifying the geographic location, which may be coordinates generated by the GPS receiver 124 when the characteristic movement patterns or user activities are detected. Data identifying a geographic location may include, but is not limited to, coordinates defining a geographic location, a land area, an address, combinations thereof, and the like.

Continuing the example of FIG. 3, the automobile parking behavior may trigger implementation of flagging a geographic location. In this example, the current geographic location of the mobile device 102 associated with the detected backwards and forwards movement, which is identified as parallel parking of the automobile, may be flagged and stored in the data store 116 for later access. The information may later be retrieved when the user interacts with the mobile device 102 for aid with finding his or her parked automobile. Later, the user may interact with the mobile device 102 to retrieve the geographic location information from storage and to display a representation of the geographic location on a displayed map. The mobile device 102 may also provide directions for guiding the user to the geographic location. In this manner, the user may be guided back to his or her parked automobile.

Returning to FIG. 2, the method includes determining a geographic location associated with one or more of the detected movements (step 208). Continuing the aforementioned example of parking an automobile, the geographic location of the last movement associated with the activity may be determined. For example, the movement response manager 122 may detect the movements and their order. When the last movement occurs, the movement response manager 122 may record its current geographic location.

The method of FIG. 2 may also include presenting identification of the activity and the geographic location (step 210). For example, the movement response manager 122 may control the interface 118 to present identification of the activity and the geographic location to a user. In an example, the mobile device 102 may display a map indicating the geographic location. An icon may specify each geographic location on the map. Further, an icon, text, or other suitable indicia may be displayed for indicating the an activity. Continuing the aforementioned example of parking an automobile, a map and an icon representing the geographic location of the parked automobile on the map may be displayed.

In accordance with embodiments of the present disclosure, identified activities and their chronological order may be presented. For example, the movement response manager 122 may determine a time of at least one movement associated with an activity. The time may be associated with the activity and stored in the data store 116. Such times may be associated with multiple activities. The movement response manager 122 may chronologically order the activities based on the associated times. The movement response manager 122 may control the interface 118 to present identifications of multiple activities and a chronological order of the activities. For example, the activities and their chronological order may be presented on a display. In an example, this information may be presented in table format or any other suitable format. Text identifying the activities and numbering indicating the chronological order may be displayed. Further, for example, a time associated with each of the activities may be presented for indicating a chronological order of the activities.

In other embodiments of the present disclosure, the mobile device 102 may crosscheck the geographic location determined to be the location of a parked automobile with data obtained from a geographic information system. This crosscheck may be implemented to confirm that the mobile device 102 has correctly identified a geographic location as being a location where automobiles can be parked. For example, referring to FIG. 1, the mobile device 102 may access a web server 104 via the Internet for obtaining information associated with coordinates associated with an identified activity, e.g., the coordinates determined to be the geographic location where the automobile was parked. For example, the mobile device 102 may communicate with the web server 104 for requesting information related to the coordinates. Exemplary geographic information systems include, but are not limited to, GOOGLE MAPS™ or MAPQUEST™ mapping services. The web server 104 may store information associated with several coordinates such as, but not limited to, information indicating the coordinates of city parking. The web server 104 may communicate this information to the mobile device 102 in response to receiving the request. Upon receipt of the information, the movement response manager 122 may analyze the information with respect to the identified activity (e.g., parking of the automobile), and verify association of the detected movement with the identified activity based on the analysis. In this way, for example, the movement response manager 122 may confirm that the geographic location determined to be the location of a parked automobile has been correctly identified. In response to confirmation, the movement response manager 122 may proceed with applying a predetermined action, such as, for example, flagging a geographic location as described herein.

According to embodiments of the present disclosure, a user of the mobile device 102 may use an application (often referred to as an "app") residing on the mobile device 102 to interact with the movement response manager 122 via the interface 118 for sharing geographic location information with another computing device. The application may reside on the mobile device 102 and may be a part of the movement response manager 122. The user may, for example, input commands into the interface 118 for selecting an icon to initialize the application. The application may have been downloaded from a web server and installed on the mobile device 102 in any suitable manner. The application may be downloaded to another machine (such as the mobile phone user's PC) and then transferred to the mobile device over a medium, such as a Bluetooth connection. In an example, the application can enable the mobile device 102 with one or more of the features according to embodiments of the present disclosure. Further, the geographic location information generated by this application may be automatically shared with another application such as, for example, an application providing information on locating a parked automobile or other object.

After initialization of the application, the movement response manager 122 may control the user interface 118 to present one or more prompts for a user to input commands. For example, a user may be presented with one or more icons, buttons, text, maps, audio, and/or other graphical information for aiding the user with identifying a contact in an address book, or other suitable contact list, residing on the mobile device 102. The address book and its contact entries may be stored in, for example, the data store 116 shown in FIG. 1. A contact entry may include, but is not limited to, a name, physical address, telephone numbers, email addresses, the like, and combinations thereof for an entity, such as, but not limited to, a person and a business. The user may use the interface 118 to select icons, enter text or other types of data, interact with a graphical map, and the like for selecting one or more contacts to be associated with a predetermined action. For example, the selected contacts may be associated with a flagged geographic location. This may be a geographic location that has been flagged in response to identification of an activity of a user in accordance with embodiments of the present disclosure. In this embodiment, the mobile device 102 may communicate the coordinates of the flagged geographic location to another mobile device, such as mobile device 130. In this way, other users may be made aware of the flagged geographic location. The information about the flagged geographic location may be made available to the other mobile device either automatically in response to identification of the activity of a user, or in response to manual selection of the contact for sharing the information.

As an example, two or more users may be designated as "friends" in their respective contact lists. Contacts designated as friends may share a flagged geographic location with each other. For example, the flagged geographic location information generated by one user may be automatically communicated with a designated friend, such as a contact associated with mobile device 120. On receipt of the information, the contact entry associated with the sender may be suitably marked to indicate that the contact entry is associated with flagged geographic information. The recipient may interact with the contact entry for displaying a representation of the geographic location on a displayed map.

In another example, the computing devices of users designated as friends may share current geographic location information with one another. For example, the GPS receiver 124 of the mobile device 102 may output coordinates for indicating a current geographic location of the mobile device 102. The movement response manager 122 may be configured to automatically share this geographic location information with contacts designated as friends. Alternatively, the movement response manager 122 may share with other devices information associated with any other identified activity in accordance with embodiments of the present disclosure.

In an example of sharing geographic location information, a user may share geographic location information indicating the location of his or her parked automobile with another user. The other user may be a friend or family member and identified as being a friend in a contact list. When the user parks his or her automobile, the user's mobile device may recognize that the movements are associated with parking an automobile, and in response, may flag the geographic location. In addition, the user's mobile device may share the flagged geographic location information (e.g., coordinates of the geographic location) with the contact designated as a friend. In an example, the user may verbally tell the friend that he or she may borrow the parked automobile. The friend may access his or her contact list for displaying information about the location of the parked automobile.

In another example of sharing geographic location information, a user may be riding or driving an automobile when the automobile is involved in an accident, such as a wreck. During the accident, the automobile may come to a sudden stop or quick deceleration. This movement can be detected by a mobile device being carried by the automobile in accordance with embodiments of the present disclosure. The mobile device may identify the movement as being associated with an automobile accident. In response to identifying the activity, the mobile device may automatically flag the geographic location where the activity was detected, and notify specified contacts, or friends, of the event and the flagged geographic location. In this way, specified contacts can be immediately notified of automobile accidents involving the mobile device user.

In another example of sharing geographic location information, the information may be shared among selected other users of a social networking service. Such services are available on the Internet. By use of a social networking service (e.g., FACEBOOK® social networking service provided by Facebook, Inc. of Cambridge, Mass.), users can add other users as friends and send them messages, and update their personal profiles to notify other users about themselves, such as the geographic location information generated in response to detected movements according to embodiments of the present disclosure. Such information can be automatically made available to the selected social networking users in response to generation of the information. In this way, computing device users can receive geographic location information of others.

In another example of sharing geographic location information, a user can utilize any suitable service that stores user's geographic location information. For example, FIRE EAGLE™ (available from Yahoo! Inc. of Santa Clara, Calif.) is a service that acts as a store for user's geographic location information. A user can authorize other services and applications to update or access this information via the Fire Eagle API, allowing a user to share his or her geographic location information and then use it on any Fire Eagle enabled-website. In this way, mobile device users can receive geographic location information of others.

Figure 4:
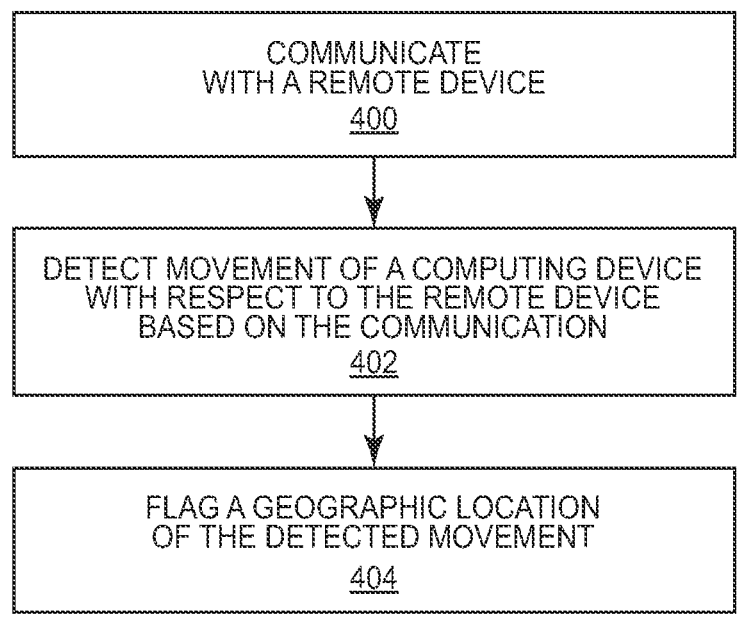
FIG. 4 is a flow chart of another exemplary method for applying a predetermined action based on detected movement of a computing device according to embodiments of the present disclosure.

In accordance with embodiments of the present disclosure, a computing device may determine movement based on proximity of the computing device to another device. For example, FIG. 4 illustrates a flow chart of another exemplary method for applying a predetermined action based on detected movement of a computing device according to embodiments of the present disclosure. In this example, reference is made to the mobile device 102 shown in FIG. 1 for purposes of illustration; however, reference to the mobile device 102 should not be construed as limiting, and it should be appreciated that the method may be implemented by any suitable computing device.

Referring to FIG. 4, the method includes communicating with a remote device (step 400). For example, the mobile device 102 may be sufficiently close to a radio frequency identification (RFID) component or chip 132 such that wireless communication is established, as depicted in FIG. 1. The mobile device 102 may recognize that the RFID component 132 is in close proximity in response to receiving signals from the RFID component 132. In an example, the RFID component 132 may be a component of an automobile (e.g., placed in a steering column of an automobile) or otherwise carried by the automobile.

At step 402 of FIG. 4, movement of a computing device with respect to the remote device can be detected based on the communication. For example, the mobile device 102 may determine that it has moved if it is no longer receiving signals from the RFID component 132. For example, if the mobile device 102 moves further than 10 feet from the RFID component 132, the mobile device 102 may no longer receive signals from the RFID component 132, and in response, the mobile device 102 may determine that it has moved from a parked automobile. In another example, if the strength of the signal decreases beyond a predetermined threshold, the mobile device 102 may determine that it has moved from a parked automobile.

At step 404 of FIG. 4, a geographic location of the detected movement may be flagged. For example, the geographic location may be flagged in a mapping application residing on the mobile device 102. Subsequently, the user may interact with the computing device to display a map indicating the flagged geographic location for guiding the user back to the location. For example, the mobile device user may interact with the mobile device for displaying the flagged geographic location on a displayed map. In this way, for example, the user can use the map for guidance in returning to his or her parked automobile.

As described herein above, a set of statistical analyses and comparisons against rule-based inferences may be performed for determining whether to perform a predetermined action based on detected movement. For example, the movement response manager 122 shown in FIG. 1 may be configured to perform these statistical analyses and comparisons based on output of the GPS receiver 124, the accelerometer 126, and the magnetometer 128. The rule-based inferences can be applied to identify the occurrence of the characteristic movement patterns or user activities. In response to detection of characteristic movement patterns or user activities, a predetermined action may be applied.

In an example, a user may enter or otherwise select one or more movement inference rules for identifying an activity of a user of a computing device based on detected movement.

The rules may be included with an application, and selection of the rules may require interacting with the application for enabling the rules. A rule may specify one or more steps or functions that are applied in response to the computing device detecting a movement. If the detected movement meets specified criteria, a predetermined action may be applied in accordance with embodiments of the present disclosure. For example, the criteria may specify that the detected movement must meet predetermined criteria for motion such as, but not limited to, a predetermined speed of the mobile device, a predetermined velocity of the mobile device, a predetermined position of the mobile device, a predetermined route traveled by the mobile device, a predetermined direction of motion of the mobile device, a predetermined acceleration of the mobile device, a predetermined change in direction of the mobile device, and combinations thereof. If the detected movement does not meet the criteria, no action will be applied.

In accordance with other embodiments of the present disclosure, a mobile device may detect movements and identify the movements as being associated with automobile driving activity. In response to identifying the movements as being associated with driving activity, the mobile device may automatically prevent the device from initiating communications to other devices and/or accepting communications from other devices. For example, text messaging may be prevented. Other communications may be allowed, such as voice communications.

In accordance with other embodiments of the present disclosure, a mobile device may detect movements and identify the movements as being associated with automobile driving activity. In response to identifying the movements as being associated with driving activity, the mobile device may automatically report to another specified device of the driving activity.

In accordance with other embodiments of the present disclosure, a mobile device may automatically display a map in response to detecting predetermined movements. For example, a map application may automatically be launched on detection of the movements. Further, certain detected movements may cause the map to be presented at different zoom levels. For example, if the device detects slow movement, it may be inferred that the user is walking and, in response, displays the map zoomed in. In contrast, if the device detects faster movement, it may be inferred that the user is driving and, in response, displays the map further zoomed out. This control of the zoom function of the map application may be automatically controlled in response to the movement detection.

Indicating a Confidence Level for Associating Computing Device Movement with an Activity of a User Based on Movement and Activity Information As discussed above, other embodiments of the present disclosure enable a server, or any other suitable computing device, to receive movement information and associated activity information from a plurality of computing devices. For example, the computing devices may each detect movements, identify activities based on the detected movements, and communicate the movement and activity information to the server. The server may determine a confidence level for associating computing device movement with an activity of a user based on the movement information and associated activity information. For example, the server may apply statistics for determining whether a specified movement should be correlated to an activity. The server may determine a confidence level for correlating a detected movement to an activity. The server may also communicate the confidence level to other computing devices. Such confidence level information may be used by the other computing devices for identifying an activity of a user based on a movement and for applying a predetermined action in response to identifying the activity.

Figure 5:
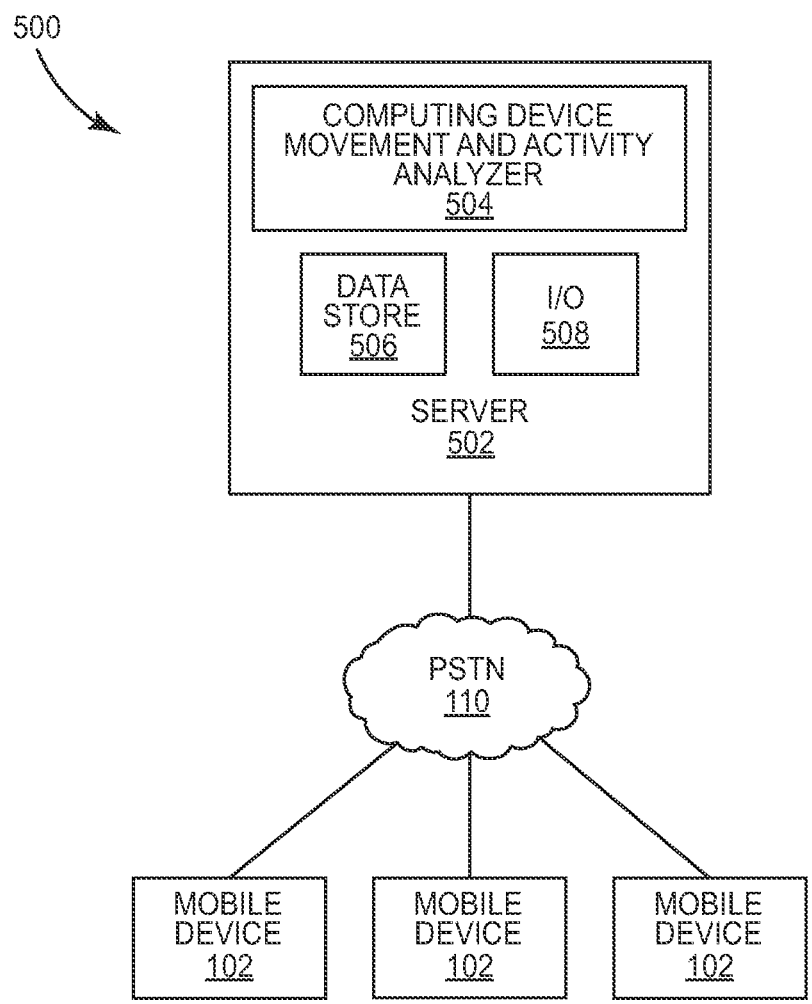
FIG. 5 is a schematic diagram of a system 500 for receiving movement information and associated activity information from computing devices, determining a confidence level for associating computing device movement with an activity of a user based on the movement information and associated activity information, and communicating the confidence level to another computing device according to embodiments of the present disclosure.

For example, FIG. 5 is a schematic diagram of a system 500 for receiving movement information and associated activity information from computing devices, determining a confidence level for associating computing device movement with an activity of a user based on the movement information and associated activity information, and communicating the confidence level to another computing device according to embodiments of the present disclosure. Referring to FIG. 5, the system 500 includes a server 502 and mobile devices 102, which may each be any type of computing device capable of detecting movement and communications with a server via a network. One or more of the mobile devices 102 may include some or all of the functions of the mobile devices described herein. The functions of receiving movement information and associated activity information from computing devices, determining a confidence level for associating computing device movement with an activity of a user based on the movement information and associated activity information, and communicating the confidence level to another computing device and others in accordance with the present disclosure may be implemented by a computing device movement and activity analyzer 504 residing on the server 502. The server 502 may also include a data store 506 for storing data needed for these and other functions. The server 502 may also include an I/O module 508 for communicating the PSTN 110 or another suitable network.

Figure 6:
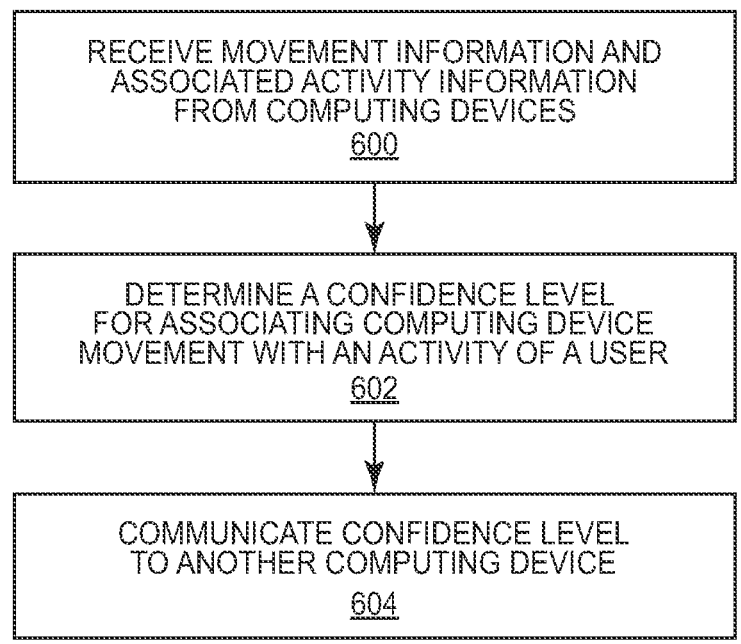
FIG. 6 is a flow chart of an exemplary method for receiving movement information and associated activity information from computing devices, determining a confidence level for associating computing device movement with an activity of a user based on the movement information and associated activity information, and communicating the confidence level to another computing device according to embodiments of the present disclosure.

FIG. 6 illustrates a flow chart of an exemplary method for receiving movement information and associated activity information from computing devices, determining a confidence level for associating computing device movement with an activity of a user based on the movement information and associated activity information, and communicating the confidence level to another computing device according to embodiments of the present disclosure. In this example, reference is made to the server 502 shown in FIG. 5 for purposes of illustration; however, reference to the server 502 should not be construed as limiting, and it should be appreciated that the method may be implemented by any suitable computing device.

Referring to FIG. 6, the method includes receiving movement information and associated activity information from computing devices (step 600). For example, the mobile devices 102 may each detect their movements and identify activities of their respective users in accordance with embodiments of the present disclosure. All or a portion of such movement and activity information may be communicated from the mobile devices 102 to the server 502. This information may be communicated to the server 502 at set intervals or in response to a request by the server 502.

The method of FIG. 6 includes determining a confidence level for associating computing device movement with an activity of a user based on the movement information and associated activity information (step 602). For example, in response to receipt of some or all of the communicated movement and activity information, the analyzer 504 of the server 502 may apply statistical analyses to the information for determining a confidence level for correlating a detected movement or movements to an activity. For example, if movements of computing devices are commonly associated with a particular activity, a high level of confidence can be assigned between the particular movements and activity. In contrast, if such computing device movements are not commonly associated with a particular activity, a low level of confidence may be assigned between the particular movements and activity. The confidence information may be stored in a suitable data store of the server 502.

The method of FIG. 6 includes communicating the confidence level to another computing device (step 604). For example, the analyzer 504 of the server 502 may communicate the confidence level information to another computing device. The computing device may be one of the computing devices shown in FIG. 5 or another of the computing devices. The confidence level information may include the activity and movement(s) associated with the confidence level. Such confidence level information may be used by the recipient device for identifying an activity of a user based on a movement and for applying a predetermined action in response to identifying the activity.

In response to receiving the confidence level information, the recipient computing device may automatically apply an action in response to determining that one or more of its detected movements correspond to the movement(s) identified in the confidence level information. For example, a high confidence level may be assigned to certain movements as being related to the activity of parking an automobile. If the recipient computing device detects similar movements, the device may determine that the movements correspond to the activity of parking an automobile.

In accordance with one or more embodiments of the present disclosure, the server 502 may receive from the mobile devices 102 identifications of actions applied by the mobile devices. The identified actions may be those that are associated with the activities identified in the activity information. The determined confidence level may be used for determining how much of a correlation there is between detected movement(s) and an action actually applied by the computing devices. Such information may be communicated to other computing devices and used by the recipients for determining whether to apply a predetermined action based on detected movements.

In one or more embodiments, a server may compile a listing of activities and associated movements at a geographic location. For each listed activity, the server may assign a confidence level that computing device movement(s) should be associated with the activity at the geographic location. For example, the server 502 may receive movement information and identification of a geographic location from each of a plurality of mobile devices. In this example, the movement information may correspond to the parking of an automobile. The server 502 may communicate the movement information, the geographic location information, and confidence level information, and identify the activity of parking of an automobile to one or all of the mobile devices 102. When a recipient device detects corresponding movements at the geographic location, the device may determine that there is a high level of confidence that the user is parking an automobile, and in response, the device may automatically mark the geographic location with a breadcrumb. Applications may launch in response to a confidence level being above a predetermined threshold.

In accordance with other embodiments, multiple activities and actions can be associated with a geographic location. Particular identified computing device movements can be associated with the activities and actions. For example, a particular geographic location may be identified as being at or near a parking lot for a grocery store. If the mobile device detects certain movements at the geographic location, there may be a high level of confidence that the user is parking his or her automobile. As a result, a breadcrumb may be automatically associated with the geographic location. In addition, it may be assumed that the user is going to shop at the nearby grocery store. In response to determining or inferring that the user is going to shop, the mobile device may automatically launch an application for presenting a grocery list that the user has generated.

Figure 7:
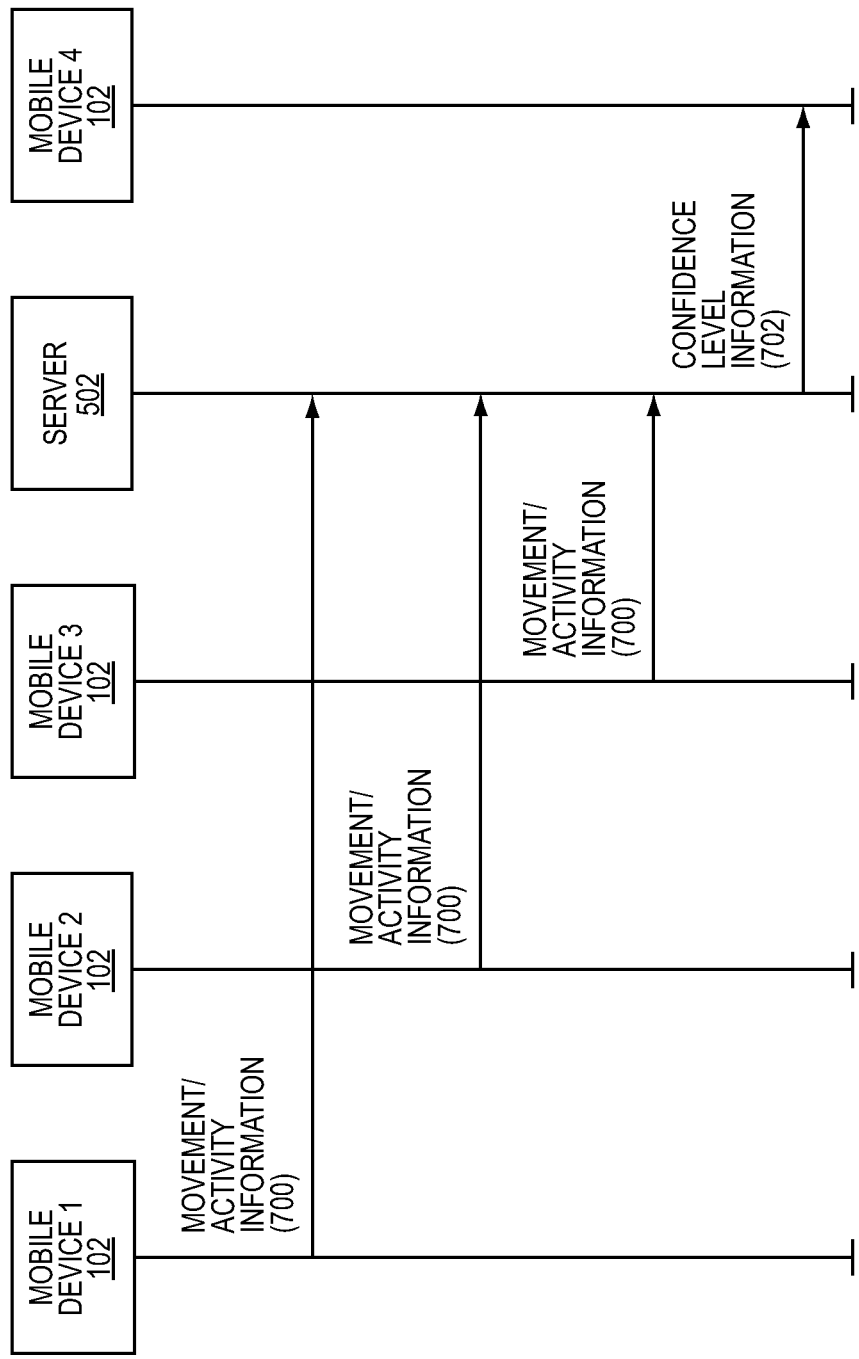
FIG. 7 is a message flow diagram of an exemplary operation of the system of FIG. 1 according to embodiments of the present disclosure.

FIG. 7 illustrates a message flow diagram of an exemplary operation of the system of FIG. 5 according to embodiments of the present disclosure. Referring to FIG. 7, multiple mobile devices 102 may detect movements and identify activities of their respective users based on the detected movements in accordance with embodiments of the present disclosure. The activities may also be identified based on a chronological order of the detected movements as described in the examples provided herein. All or a portion of the movement activity may be communicated by the mobile devices 102 to the server 502 (step 700). In accordance with embodiments of the present disclosure, the server 502 may determine a confidence level for associating a computing device movement with an activity of a user based on the received movement information and associated activity information. The confidence level information, including the activity and movement(s) associated with the confidence level, may be communicated from the server 502 to another mobile device 102 (step 702). Such confidence level information may be used by the recipient device for identifying an activity of a user based on a movement and for applying a predetermined action in response to identifying the activity.

Figure 8:
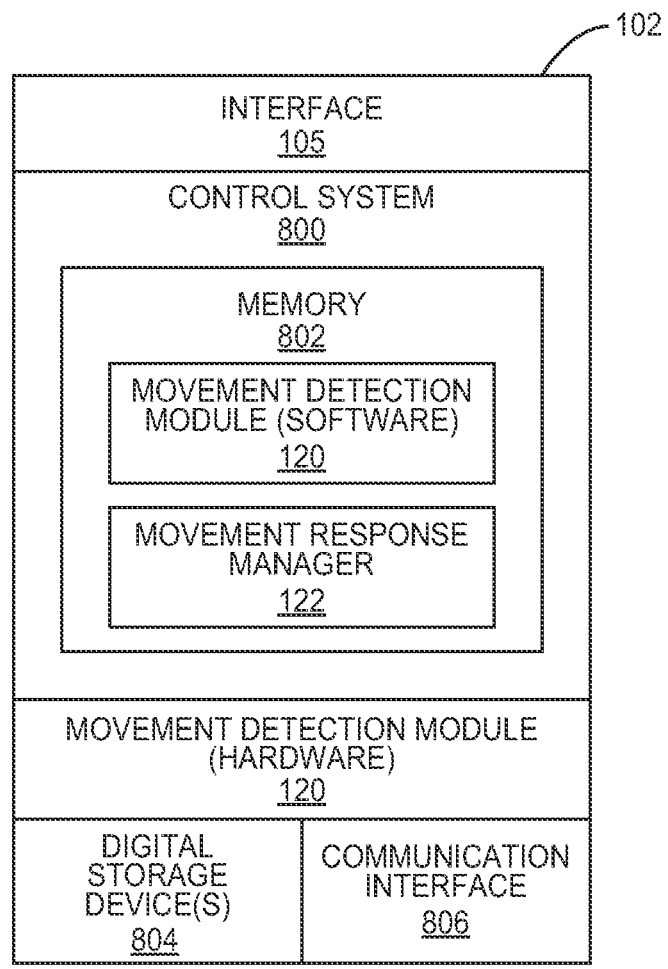
FIG. 8 is a block diagram of the mobile device shown in FIG. 1 according to embodiments of the present disclosure.

FIG. 8 is a block diagram of the mobile device 102 shown in FIG. 1 according to embodiments of the present disclosure. Referring to FIG. 8, the mobile device 102 may include a control system 800 having associated memory 802. In this example, the movement response manager 122 is implemented in software and stored in the memory 802. However, the present disclosure is not limited thereto. The movement response manager 122 may be implemented in software, hardware, or a combination thereof. Further, in this example, the movement detection module 120 is implemented in hardware and software, which is stored in memory 802. The movement detection module 120 may include a GPS receiver, accelerometer, a magnetometer, and/or any other suitable equipment for detecting movement. In addition, the mobile device 102 may include one or more digital storage devices 804 such as, for example, one or more hard disk drives. The mobile device 102 may also include a communication interface 806 communicatively coupled to the base station 106 shown in FIG. 1. The mobile device 102 may also include the interface 105, which may include components such as, for example, a display, one or more user input devices, or the like.

Presenting Identification of a Deduced Activity

In accordance with embodiments of the present disclosure, various activities of a user of a computing device may be identified and used for deducing another activity of the user. For example, movements of a computing device may be detected using techniques as described herein. Using the detected movements, the computing device may infer one or more activities of the user such as, for example, detecting an activity of leaving a parking space at work and detecting an activity of parking an automobile at home. In this example, these activities may be used by the computing device for deducing that the user is driving home from work. In accordance with embodiments of the present disclosure, the computing device may determine a confidence level that the activity is the user's actual activity. Using the confidence levels associated with a collection of identified activities, the computing device can determine a confidence level that the deduced activity is the user's actual activity. The activities may be presented, such as by display, to the user in association with their chronological order and any associated geographic locations.

Figure 9:
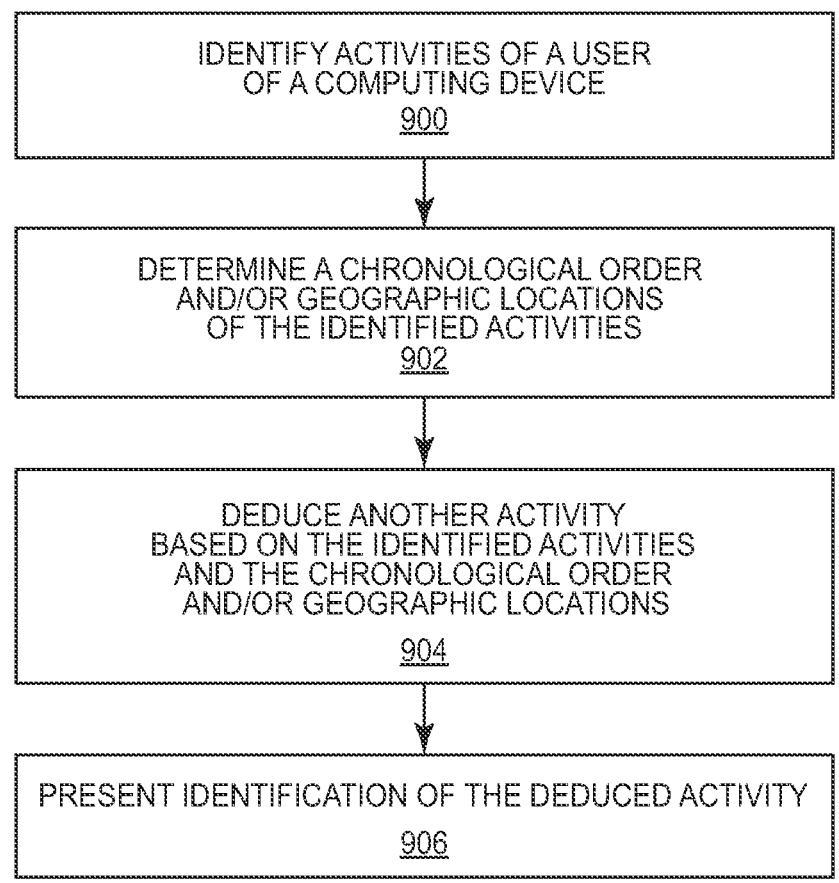
FIG. 9 is a flow chart of an exemplary method for presenting identification of a deduced activity according to embodiments of the present disclosure.

FIG. 9 illustrates a flow chart of an exemplary method for presenting identification of a deduced activity according to embodiments of the present disclosure. In this example, reference is made to the mobile device 102 shown in FIG. 1 for purposes of illustration; however, reference to the mobile device 102 should not be construed as limiting, and it should be appreciated that the method may be implemented by any suitable computing device. In addition, reference is made to the display shown in FIG. 10 for purposes of illustration only, and the example of FIG. 10 should not be construed as limiting as any suitable technique may be used for presenting activity identifications, chronological ordering, and/or geographic location information to a computing device user.

Referring to FIG. 9, the method includes identifying activities of a user of a computing device (step 900). For example, detected movements of a computing device or other information may be used for identifying an activity of a user. Referring to FIG. 1, for example, an activity analyzer 134 may receive data corresponding to detected movements and identify an activity of the user, such as leaving a parking space at work and detecting an activity of parking an automobile at home in accordance with embodiments of the present disclosure.

The method of FIG. 9 may also include determining at least one of a chronological order and geographic locations of the identified activities (step 902). For example, in response to detecting or identifying an activity of a user, the activity analyzer 134 may time stamp the activity and store identification of the activity and its associated time stamp information in the data store 116. In this way, a chronological order of multiple activities may be determined. In another example, as activities are identified, a chronological ordering of the activities may be generated based only on the order in which the activities were identified. Further, for example, the geographic location associated with each activity may be determined in response to identifying or otherwise detecting the activity.

The method of FIG. 9 may also include deducing another activity based on the identified activities and at least one of the chronological order and geographic locations (step 904). For example, in response to identifying the activities of leaving a parking space at work and detecting an activity of parking an automobile at home, the activity analyzer 134 may deduce or infer that the user has driven home.

Further, for example, the activity analyzer 134 may use chronological information associated with identified activities for deducing that another activity has occurred. Continuing with the aforementioned example, if stored information indicates that the activity of leaving a parking space at work occurred before the activity of parking the automobile at home, the activity analyzer 134 may determine that the user is driving home. Conversely, for example, if stored information indicates that the activity of leaving a parking space at home occurred before the activity of parking the automobile at work, the activity analyzer 134 may determine that the user is driving to work.

Other information, such as geographic location, may be used for deducing an activity. For example, continuing the aforementioned example, if it is determined that the automobile stops at home and had been parked at work, the activity analyzer 134 may determine that the user has driven home from work. Additional geographic location information may also be used for deducing the activity. For example, if the activity analyzer 134 receives information indicating movement along a road in a direction towards the home of the user, further confirmation is provided that the user has driven home.

Figure 10:
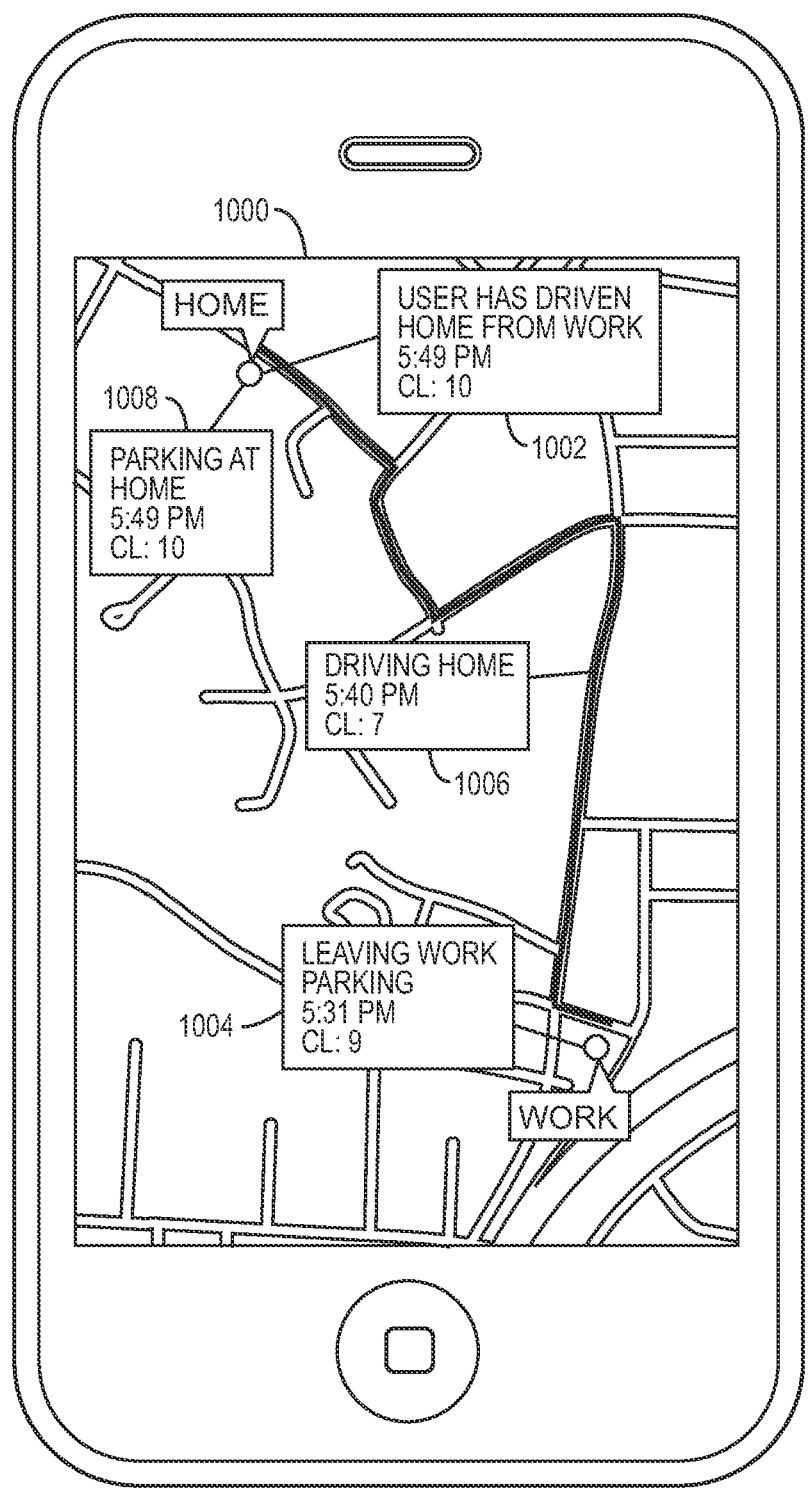
FIG. 10 is a display screen showing display of identified activities of a computing device user and a deduced activity according to embodiments of the present disclosure.

The method of FIG. 9 may also include presenting identification of the deduced activity (step 906). For example, in response to deducing the other activity, the activity analyzer 134 may control the interface 118 to present the deduced activity to the user, such as by use of a display. Referring to FIG. 10 for example, the figure illustrates a display screen 1000 showing display of identified activities of a computing device user and a deduced activity according to embodiments of the present disclosure. For example, based on previously occurring detected activities, the activity analyzer 134 may determine that the user has driven home from work and display text indicating such activity in text box 1002. These activities may include: leaving work parking (indicated by text box 1004), driving home (indicated by text box 1006), and parking at home (indicated by text box 1008). Text indicating identification of these activities may be displayed in the text boxes 1004, 1006, and 1008.

Further, text boxes 1002, 1004, 1006, and 1008 may indicate a chronological order of the activities and their associated geographic locations. For example, each text box indicates a time when the activity was identified or detected. Further, the text boxes are shown in association with a road map for specifying where the activities were identified or detected.

Text boxes 1002, 1004, 1006, and 1008 may each indicate a confidence level associated with the activity in accordance with embodiments of the present disclosure. In this example, the confidence levels are indicated on a scale from 1 to 10, where 1 is the lowest confidence level and 10 is the highest confidence level. Text box 1004 indicates that there is a relatively high confidence of 9 that the user is leaving work parking at 5:31 PM. Text box 1006 indicates that there is a relatively high confidence of 7 that the user is driving home at 5:40 PM. The highest confidence of 10 is assigned to the activity of text box 1008, which indicates that the user is parking at home based on a comparison of the current location of the device to a known location of the home of the user. Text box 1002 is also assigned the highest confidence of 10, which is based on the confidence levels of the activities associated with text boxes 1004, 1006, and 1008.

The various techniques described herein may be implemented with hardware or software or, where appropriate, with a combination of both. For example, the mobile device 102 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
at a mobile computing device comprising a processor and memory:
receiving a user selection of an activity inference rule for inferring an activity of the user of the mobile computing device, the activity inference rule comprising at least one user selected predetermined transition movement criteria and at least one user selected predetermined action associated with the inferred activity of the mobile computing device;
determining a chronological set of movement information based on movement information received from at least one of an accelerometer and a magnometer of the mobile computing device;
determining a transition movement based on the chronological set of movement information;
determining the transition movement meets the at least one user selected predetermined transition movement criteria of the activity inference rule; and
in response to determining the transition movement meets the at least one user selected predetermined transition movement criteria of the activity inference rule:
inferring an activity of the user of the mobile computing device based on the determined transition movement;
determining a geographic location associated with the identified activity based on the determined transition movement; and
applying the at least one user selected predetermined action of the activity inference rule.

2. The method of claim 1, wherein determining the chronological set of movement information comprises receiving movement information received from a satellite navigation system.

3. The method of claim 1, wherein determining the chronological set of movement information comprises:
communicating with a remote device; and
determining that the mobile computing device is moving with respect to the remote device based on the communication.

4. The method of claim 1, wherein determining a geographic location associated with the inferred activity based on the determined transition movement comprises:
determining current coordinates of the mobile computing device, and
storing the coordinates with the inferred activity.

5. The method of claim 1, wherein identifying inferring an activity of the user based on the determined transition movement comprises:
inferring at least one of the user parking an automobile and an accident involving an automobile.

6. The method of claim 1, wherein the user-selected predetermined action comprises presenting identification of the inferred activity and the geographic location to the user of the mobile computing device.

7. The method of claim 1, wherein the user-selected predetermined action comprises communicating identification of the inferred activity and the geographic location to another computing device for presentation to a user of the other computing device.

8. The method of claim 7, wherein the user of the other computing device is specified in a contact list of the mobile computing device.

9. The method of claim 8, further comprising receiving an indication that the inferred activity and the geographic location are associated with a contact entry of the contact list.

10. The method of claim 1, comprising determining whether the geographic location associated with the inferred activity is confirmed.

11. The method of claim 10, wherein determining whether the geographic location associated with the inferred activity is confirmed comprises:
accessing a geographic information system to obtain information associated with the geographic location;
analyzing the information with respect to the inferred activity; and
verifying association of the geographic location with the inferred activity based on the analysis.

12. The method of claim 1, further comprising analyzing the chronological set of movement information to determine at least one of a speed, a velocity, a position, and a route of the mobile computing device, and
wherein inferring an activity comprises inferring the activity of the user of the mobile computing device based on the at least one of a speed, a velocity, a position, and a route of the mobile computing device.

13. The method of claim 1, wherein applying the at least one user-selected predetermined action of the activity inference rule comprises controlling an application to implement a predetermined command.

14. A method comprising:
at a mobile computing device comprising a processor and memory:
receiving a user selection of an activity inference rule for inferring an activity of the user of the mobile computing device, the activity inference rule comprising at least one user-selected predetermined transition movement criteria and at least one user-selected predetermined action associated with the inferred activity of the mobile computing device;
receiving movement information from at least one of an accelerometer and a magnometer of the mobile computing device;
determining a chronological order of the received movement information;
determining a transition movement based on the chronological order of the received movement information;

determining whether the transition movement meets the at least one user-selected predetermined transition movement criteria of the activity inference rule;

in response to determining the transition movement meets the at least one user-selected predetermined transition movement criteria of the activity inference rule:

inferring an activity of the user of the mobile computing device based on the determined transition movement and the chronological order; and applying the at least one user-selected predetermined action of the activity inference rule.

15. The method of claim 14, wherein receiving movement information comprises using at least one of a satellite navigation system to receive the movement information.

16. The method of claim 14, wherein receiving movement information comprises:

communicating with a remote device; and determining that the mobile computing device is moving with respect to the remote device based on the communication.

17. The method of claim 14, wherein applying the at least one user-selected predetermined action of the activity inference rule comprises:

determining a geographic location of the mobile computing device; and associating the geographic location with the inferred activity.

18. The method of claim 17, wherein inferring an activity comprises inferring at least one of the user parking an automobile and an accident involving an automobile.

19. The method of claim 14, wherein applying the at least one user-selected predetermined action of the activity inference rule comprises presenting identification of the inferred activity to the user of the mobile computing device.

20. The method of claim 14, wherein applying the at least one user-selected predetermined action of the activity inference rule comprises communicating the identification of the inferred activity to another computing device for presentation to a user of the other computing device.

21. The method of claim 14, further comprising analyzing the chronological order to determine at least one of a speed, a velocity, a position, and a route of the mobile computing device, and wherein inferring an activity comprises inferring the activity of the user of the mobile computing device based on the at least one of a speed, a velocity, a position, and a route of the mobile computing device.

22. A method comprising:

at a mobile computing device comprising a processor and memory:

receiving a user selection of activity inference rules for inferring activities of a user of the mobile computing device, each of the activity inference rules comprising at least one user-selected predetermined transition movement criteria associated with each of the inferred activities of the mobile computing device;

determining a chronological set of movement information based on movement information received from at least one of an accelerometer and a magnetometer of the mobile computing device;

determining transition movements based on the chronological set of movement information;

inferring activities of the user of a mobile computing device based on the determination the transition movements meet the user-selected predetermined transition movement criteria of the activity inference rules;

determining a chronological order and geographic locations of the inferred activities;

deducing another activity of the user based on the inferred activities and the chronological order and geographic locations of the inferred activities; and presenting identification of the deduced activity.

23. The method of claim 22, wherein determining a chronological set of movement information comprises using a satellite navigation system.

24. The method of claim 22, wherein determining a chronological order of the inferred activities comprises determining a time associated with an occurrence of each inferred activity.

25. The method of claim 22, wherein determining geographic locations of the inferred activities comprises using a satellite navigation system to determine coordinates associated with an occurrence of each inferred activity.

26. The method of claim 22, wherein deducing another activity of the user comprises:

determining confidence levels for the inferred activities of a user of the mobile computing device; and determining the deduced activity based on the confidence levels for the inferred activities.

27. The method of claim 22, further comprising presenting the chronological order in association with the inferred activities and the deduced activity.

28. The method of claim 22, further comprising presenting the geographic locations in association with the inferred activities and the deduced activity.

29. The method of claim 22, wherein presenting identification of the deduced activity comprises displaying identification of the deduced activity.

30. A system comprising:

a movement detection module configured to detect movements of a mobile computing device; and a movement response manager configured to:

receive a user selection of an activity inference rule for inferring an activity of the user of the mobile computing device, the activity inference rule comprising at least one user selected predetermined transition movement criteria and at least one user selected predetermined action associated with the inferred activity of the mobile computing device;

determine a chronological set of movement information based on movement information received from at least one of an accelerometer and a magnometer of the mobile computing device;

determine a transition movement based on the chronological set of movement information;

determine the transition movement meets the at least one user selected predetermined transition movement criteria of the activity inference rule; and in response to determining the transition movement meets the at least one user selected predetermined transition movement criteria of the activity inference rule:

infer an activity of the user of the mobile computing device based on the determined transition movement;

determine a geographic location associated with the identified activity based on the determined transition movement; and apply the at least one user selected predetermined action of the activity inference rule.

31. A system comprising:

a movement detection module configured to detect movements of a mobile computing device; and a movement response manager configured to:

receive a user selection of an activity inference rule for inferring an activity of the user of the mobile computing device, the activity inference rule comprising at least one user-selected predetermined transition movement criteria and at least one user-selected predetermined action associated with the inferred activity of the mobile computing device;
receive movement information from at least one of an accelerometer and a magnometer of the mobile computing device;
determine a chronological order of the received movement information;
determine a transition movement based on the chronological order of the received movement information;
determine whether the transition movement meets the at least one user-selected predetermined transition movement criteria of the activity inference rule;
in response to determining the transition movement meets the at least one user-selected predetermined transition movement criteria of the activity inference rule:
infer an activity of the user of the mobile computing device based on the determined transition movement and the chronological order; and
apply the at least one user-selected predetermined action of the activity inference rule.

32. A system comprising:
a mobile computing device configured to:
receive a user selection of activity inference rules for inferring activities of a user of the mobile computing device, each of the activity inference rules comprising at least one user-selected predetermined transition movement criteria associated with each of the inferred activities of the mobile computing device;
determine a chronological set of movement information based on movement information received from at least one of an accelerometer and a magnometer of the mobile computing device;
determine transition movements based on the chronological set of movement information;
infer activities of the user of the mobile computing device based the determination the transition movements meet the user-selected predetermined transition movement criteria of the activity inference rules;
determine a chronological order and geographic locations of the inferred activities; and
deduce another activity of the user based on the inferred activities and the chronological order and geographic locations;
a user interface, of the mobile computing device, configured to present identification of the deduced activity.

33. A non-transitory computer-readable storage medium having stored thereon computer executable instructions for performing the following steps:
receiving a user selection of an activity inference rule for inferring an activity of the user of a mobile computing device, the activity inference rule comprising at least one user selected predetermined transition movement criteria and at least one user selected predetermined action associated with the inferred activity of the mobile computing device;
determining a chronological set of movement information based on movement information received from at least one of an accelerometer and a magnometer of the mobile computing device;
determining a transition movement based on the chronological set of movement information;
determining the transition movement meets the at least one user selected predetermined transition movement criteria of the activity inference rule; and
in response to determining the transition movement meets the at least one user selected predetermined transition movement criteria of the activity inference rule:
inferring an activity of the user of the mobile computing device based on the determined transition movement;
determining a geographic location associated with the identified activity based on the determined transition movement; and
applying the at least one user selected predetermined action of the activity inference rule.

34. A non-transitory computer-readable storage medium having stored thereon computer executable instructions for performing the following steps:
receiving a user selection of an activity inference rule for inferring an activity of the user of a mobile computing device, the activity inference rule comprising at least one user-selected predetermined transition movement criteria and at least one user-selected predetermined action associated with the inferred activity of the mobile computing device;
receiving movement information from at least one of an accelerometer and a magnometer of the mobile computing device;
determining a chronological order of the received movement information;
determining a transition movement based on the chronological order of the received movement information;
determining whether the transition movement meets the at least one user-selected predetermined transition movement criteria of the activity inference rule;
in response to determining the transition movement meets the at least one user-selected predetermined transition movement criteria of the activity inference rule:
inferring an activity of the user of the mobile computing device based on the determined transition movement and the chronological order; and
applying the at least one user-selected predetermined action of the activity inference rule.

35. A non-transitory computer-readable storage medium having stored thereon computer executable instructions for performing the following steps:
receiving a user selection of activity inference rules for inferring activities of a user of a mobile computing device, each of the activity inference rules comprising at least one user-selected predetermined transition movement criteria associated with each of the inferred activities of the mobile computing device;
determining a chronological set of movement information based on movement information received from at least one of an accelerometer and a magnometer of the mobile computing device;
determining transition movements based on the chronological set of movement information;
inferring activities of the user of a mobile computing device based on the determination the transition movements meet the user-selected predetermined transition movement criteria of the activity inference rules;
determining a chronological order and geographic locations of the inferred activities;
deducing another activity of the user based on the inferred activities and the the chronological order and geographic locations of the inferred activities; and
presenting identification of the deduced activity.

* * * * *